US010039009B2

(12) United States Patent
Uchiyama et al.

(10) Patent No.: US 10,039,009 B2
(45) Date of Patent: *Jul. 31, 2018

(54) COMMUNICATION CONTROL APPARATUS, COMMUNICATION CONTROL METHOD, PROGRAM, AND TERMINAL APPARATUS

(71) Applicant: SONY CORPORATION, Tokyo (JP)

(72) Inventors: Hiromasa Uchiyama, Kanagawa (JP); Ryo Sawai, Tokyo (JP); Ryota Kimura, Tokyo (JP); Sho Furuichi, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/593,988

(22) Filed: May 12, 2017

(65) Prior Publication Data

US 2017/0251378 A1 Aug. 31, 2017

Related U.S. Application Data

(63) Continuation of application No. 14/654,927, filed as application No. PCT/JP2013/081409 on Nov. 21, 2013, now Pat. No. 9,674,369.

(30) Foreign Application Priority Data

Jan. 30, 2013 (JP) .................................. 2013-015379

(51) Int. Cl.
*H04W 16/18* (2009.01)
*H04W 16/16* (2009.01)

(52) U.S. Cl.
CPC .......... *H04W 16/18* (2013.01); *H04W 16/16* (2013.01)

(58) Field of Classification Search
CPC ...... H04M 11/00; H04M 11/08; H04W 16/16; H04W 16/18; H04W 16/32; H04W 24/02;
(Continued)

(56) References Cited

U.S. PATENT DOCUMENTS 7,142,861 B2 * 11/2006 Murai .................... H04J 11/004
455/443
9,674,369 B2 * 6/2017 Uchiyama ............. H04M 11/00
(Continued)

FOREIGN PATENT DOCUMENTS

JP 2011-239480 A 11/2011
JP 2011-259425 A 12/2011
(Continued)

OTHER PUBLICATIONS

International Search Report dated Jan. 28, 2014 in PCT/JP2013/081409 (with English language translation).
(Continued)

*Primary Examiner* — Kashif Siddiqui
(74) *Attorney, Agent, or Firm* — Oblon, McClelland, Maier & Neustadt, L.L.P.

(57) ABSTRACT

Provided is a communication control apparatus including: a selection unit that uses information related to one or more terminal apparatuses operable as an access point for a small cell to select a protection target cell to be protected from interference caused by a new small cell newly configured, among one or more existing cells; and a control unit that gives an instruction of an operation of the new small cell to the at least one terminal apparatus existing at a position determined in a manner that interference to each of the protection target cells selected by the selection unit does not exceed an allowable level.

18 Claims, 22 Drawing Sheets

(58) Field of Classification Search
CPC ............. H04W 72/048; H04W 72/082; H04W 84/045; H04W 88/06; H04W 88/12
See application file for complete search history.

(56) References Cited

U.S. PATENT DOCUMENTS

| | | |
|---|---|---|
| 2007/0225029 A1 | 9/2007 | Abusch-Magder |
| 2010/0261467 A1* | 10/2010 | Chou .................... H04W 24/02 455/422.1 |
| 2011/0292890 A1 | 12/2011 | Kulkarni et al. |
| 2011/0319088 A1 | 12/2011 | Zhou et al. |
| 2012/0014360 A1 | 1/2012 | Zou et al. |

FOREIGN PATENT DOCUMENTS

| | | |
|---|---|---|
| WO | WO 2010/006909 A1 | 1/2010 |
| WO | WO 2013/125151 A1 | 8/2013 |

OTHER PUBLICATIONS

"Requirements, Candidate Solutions & Technology Roadmap for LTE Rel-12 Onward" NTT DOCOMO, INC., 3GPP Workshop on Release 12 and onwards, Ljubljana, Slovenia, Jun. 11-12, 2012, 27 Pages.

Tomoki Murakami Rüchi Kudo, et al., "Effective Region Analysis of Spatial Domain Resource Sharing for Overlapping Cell" IEICE Technical Report, vol. 35, No. 5, Feb. 2, 2011, 10 Pages (with English Abstract and Cover Page).

Extended European Search Report dated Sep. 29, 2016 in Patent Application No. 13673249.0.

Combined Office Action and Search Report dated Apr. 4, 2018, in Chinese Patent Application No. 201380071193.3 (with English-language translation).

* cited by examiner

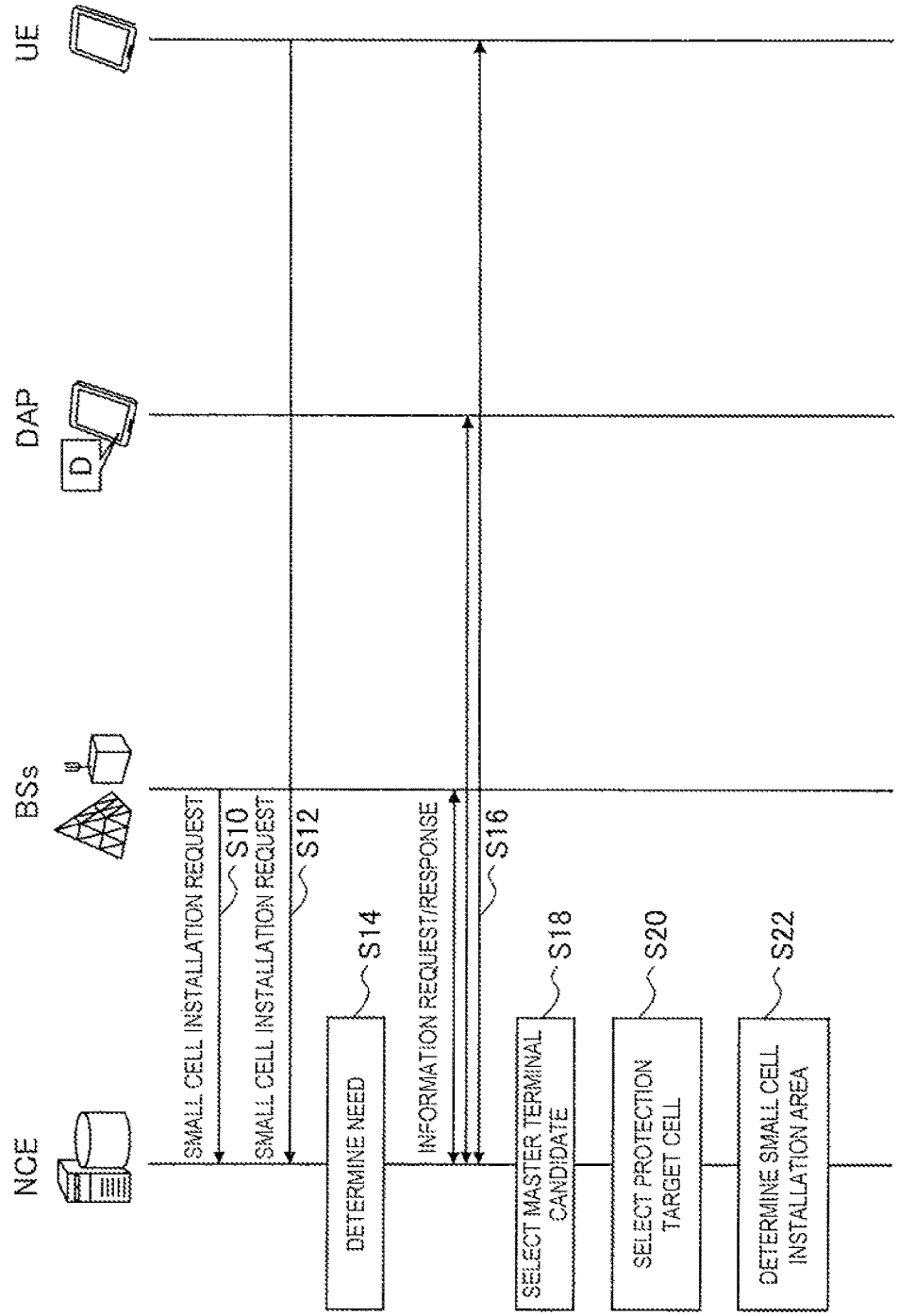

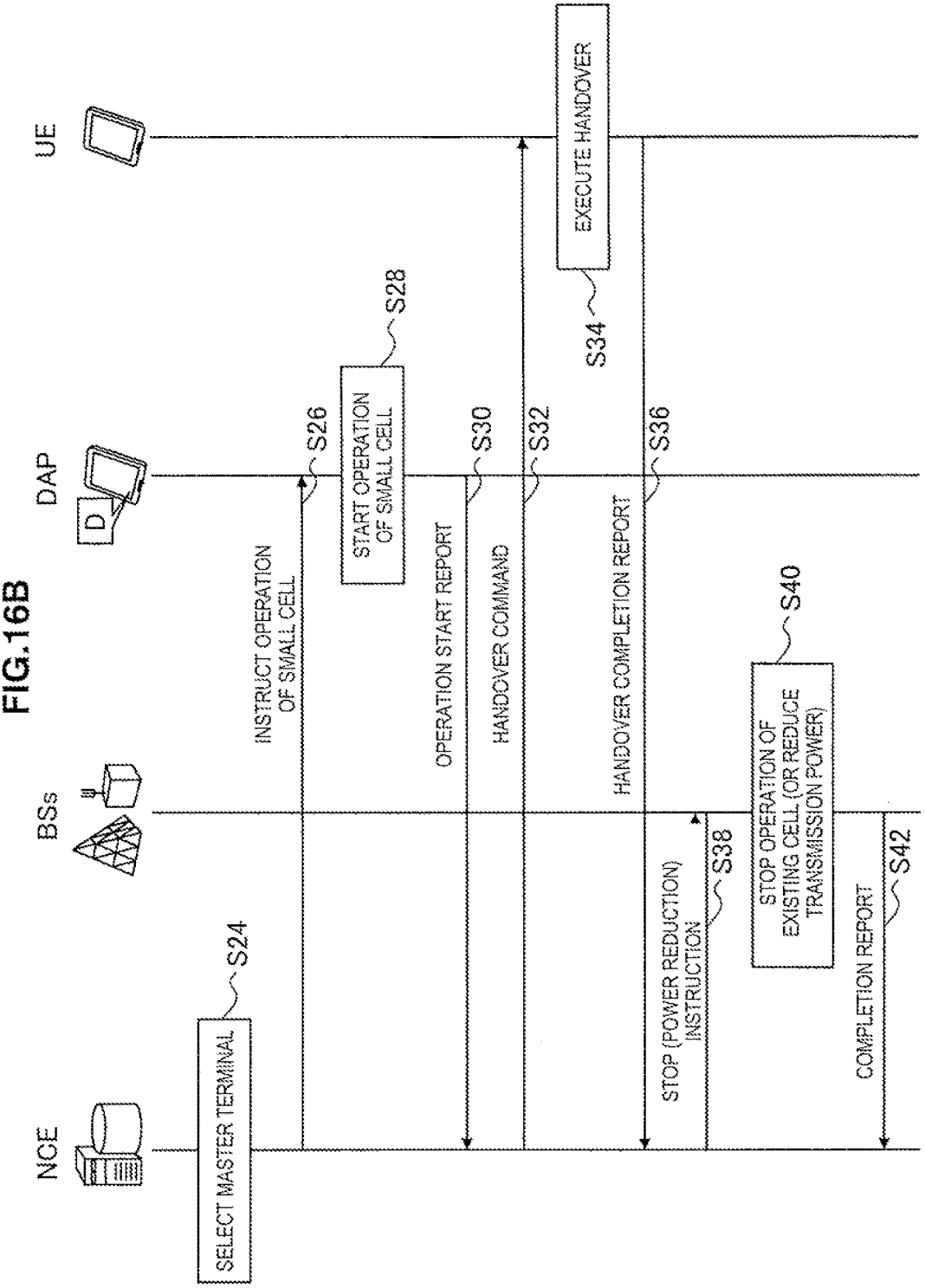

COMMUNICATION CONTROL APPARATUS, COMMUNICATION CONTROL METHOD, PROGRAM, AND TERMINAL APPARATUS

CROSS-REFERENCE TO RELATED APPLICATIONS

This application is a continuation application of and is based upon and claims the benefit of priority under 35 U.S.C. § 120 from U.S. Ser. No. 14/654,927, filed Jun. 23, 2015, herein incorporated by reference, which is a National Stage Application of International Application No. PCT/JP2013/081409, filed Nov. 21, 2013. The present document also incorporates by reference the entire contents of Japanese Patent Application No. 2013-015379 filed Jan. 30, 2013.

TECHNICAL FIELD

The present disclosure relates to a communication control apparatus, a communication control method, a program, and a terminal apparatus.

BACKGROUND ART

A recent radio communication environment has been facing the problem of depletion of frequency resources due to a rapid increase in data traffic. Accordingly, as one of measures against the depletion of the frequency resources, a heterogeneous network has been attracting attention. The heterogeneous network is a network that is formed by allowing various cells different in a radio access technology, a cell size or a frequency band to coexist. For example, there is proposed that, for the generation (5G) radio communication system after the 3GPP Release 12, a relatively low frequency band is allocated to a macro cell and a relatively high frequency band is allocated to a small cell to allow the macro cell and the small cell to be overlapped with each other (see Non-Patent Literature 1 below). Accordingly, network density can be enhanced and communication efficiency (fix example, system capacity or communication quality) can be improved.

CITATION LIST

Non-Patent Literature

Non-Patent Literature 1: NTT DOCOMO, INC., "Requirements, Candidate Solutions & Technology Roadmap for LTE Rel-12 Onward", 3GPP Workshop on Release 12 and onwards. Ljubljana, Slovenia, Jun. 11-12, 2012.

SUMMARY OF INVENTION

Technical Problem

However, due to movement of a terminal, a fading or a shadowing, the optimal arrangement of the cells dynamically changes. Therefore, it is beneficial to utilize a terminal apparatus operable as an access point (AP) for the small cell (hereinafter referred to as a dynamic AP) to allow the dynamic AP to dynamically configure the small cell according to a situation. When newly configuring the small cell, the coverage of the new small cell is normally set so as to prevent harmful interference to various existing cells. However, such a conservative method as to uniformly avoid the interference to the existing cells may eventually prevent optimal arrangement of the cells from being realized in some scenes.

Therefore, it is desirable that a system for realizing the optimal arrangement of the cells when the dynamic AP is utilized under a heterogeneous network environment is provided.

Solution to Problem

According to the present disclosure, there is provided a communication control apparatus including: a selection unit that uses information related to one or more terminal apparatuses operable as an access point for a cell to select a protection target cell to be protected from interference caused by a new small cell newly configured, among one or more existing cells; and a control unit that gives an instruction of an operation of the new small cell to the at least one terminal apparatus existing at a position determined in a manner that interference to each of the protection target cells selected by the selection unit does not exceed an allowable level.

According to the present disclosure, there is provided a communication control method including: using information related to one or more terminal apparatuses operable as an access point for a small cell to select a protection target cell to be protected from interference caused by a new small cell newly configured, among one or more existing cells; and giving an instruction of an operation of the new small cell to the at least one terminal apparatus existing at a position determined in a manner that interference to each of the protection target cells selected does not exceed an allowable level.

According to the present disclosure, there is provided a program that allows a computer that controls a communication control apparatus to function as: a selection unit that uses information related to one or more terminal apparatuses operable as an access point for a small cell to select a protection target cell to be protected from interference caused by a new small cell newly configured, among one or more existing cells; and a control unit that gives an instruction of an operation of the new small cell to the at least one terminal apparatus existing at a position determined in a manner that interference to each of the protection target cells selected by the selection unit does not exceed an allowable level.

According to the present disclosure, there is provided a terminal apparatus operable as an access point for a small cell, the terminal apparatus including: a communication unit that communicates with a communication control apparatus that selects a protection target cell to be protected from interference caused by a new small cell newly configured, among one or more existing cells; and a control unit that, when it is determined by the communication control apparatus that the terminal apparatus exists at a position determined in a manner that interference to each of the protection target cells selected by the communication control apparatus does not exceed an allowable level, starts operating the new small cell according to an instruction from the communication control apparatus.

Advantageous Effects of Invention

According to the technology according to the present disclosure, it is possible to realize optimal arrangement of cells when a dynamic AP is utilized under a heterogeneous network environment.

BRIEF DESCRIPTION OF DRAWINGS

FIG. 16A is a first half part of a sequence diagram illustrating an example of a flow of processing in a communication control system according to an embodiment.

FIG. 16B is a second half part of the sequence diagram illustrating the example of the flow of the processing in the communication control system according to an embodiment.

DESCRIPTION OF EMBODIMENTS

Hereinafter, preferred embodiments of the present invention will be described in detail with reference to the appended drawings. Note that, in this specification and the drawings, elements that have substantially the same function and structure are denoted with the same reference sips, and repeated explanation is omitted.

Furthermore, note that description will be provided in the following order.
1. Outline of technology
2. Configuration of networking control node
3. Configuration of dynamic AP
4. Processing sequence
5. Application example
6. Summary <1. Outline of Technology>

First, an outline of the technology according to the present disclosure will be discussed using FIG. 1 to FIG. 4.

[1-1. Example of Heterogeneous Network]

Figure 1:
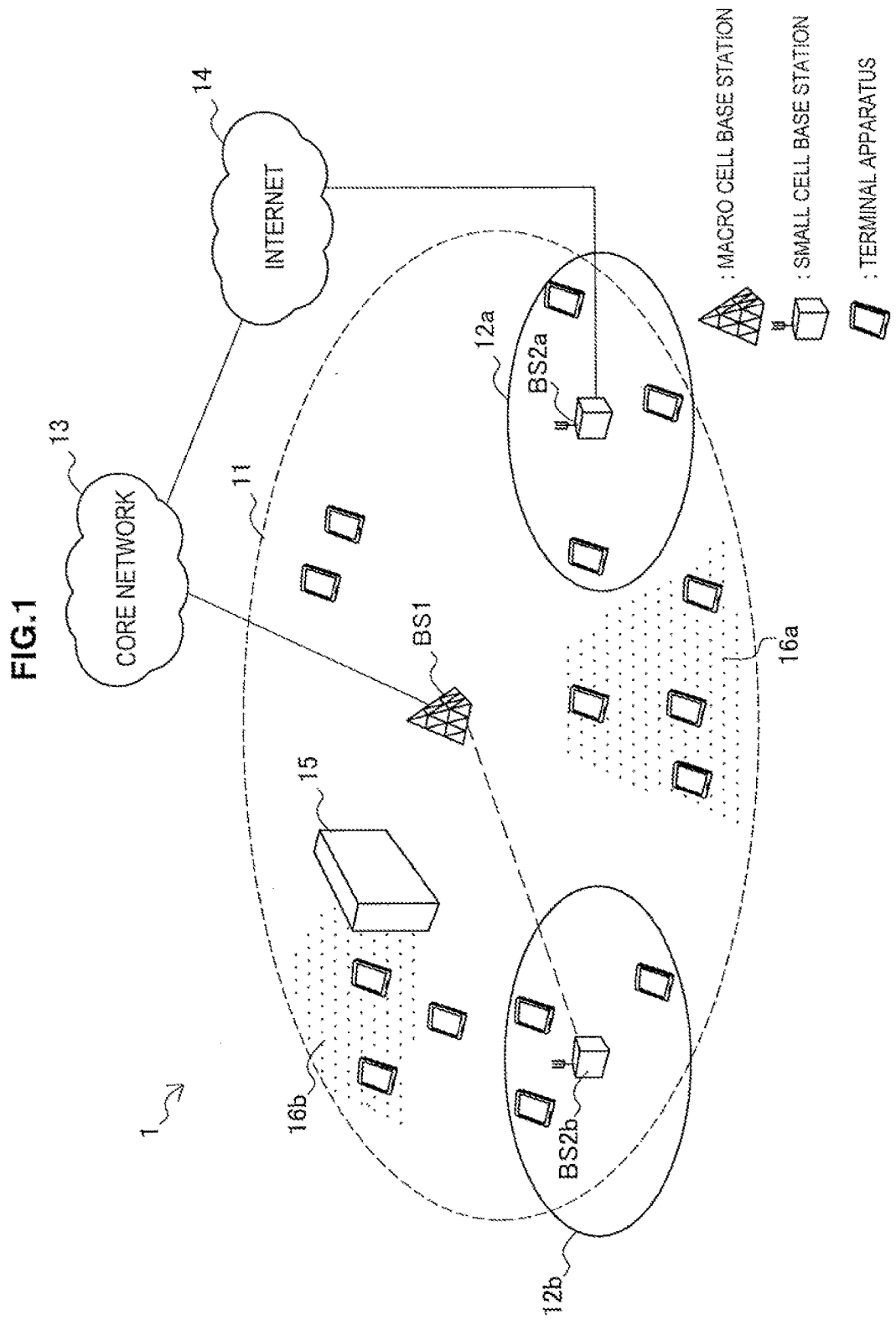
FIG. 1 is an explanatory diagram for explaining an example of a configuration of a heterogeneous network.

FIG. 1 is an explanatory diagram for explaining an example of a configuration of a heterogeneous network. With reference to FIG. 1, a heterogeneous network 1 as an example is illustrated. The heterogeneous network 1 includes a macro cell 11, a small cell 12a, and a small cell 12b. The small cell 12a and the small cell 12b are partially overlapped with the macro cell 11, respectively.

The macro cell 11 is a large-sized cell operated by a base station BS1. As an example, a radius of the macro cell 11 may be in a range from hundreds of meters to tens of kilometers. When the base station BS1 operates according to a long term evolution (LTE) system, the base station BS1 can be called an evolved node B (eNB). Note that the base station BS1 is not limited to such an example, and may operate according to other cellular communication systems such as an LTE-advanced (LTE-A) system, a WiMAX system or a wideband-code division multiple access (W-CDMA) system. The base station BS1 is connected to a core network 13. The core network is connected to the Internet 14.

The small cell is a small-sized cell compared with the macro cell. The small cell 12a is operated by a base station BS2a. The small cell 12b is operated by a base station. BS2b. The small cell herein means a concept including various kinds of relatively small cells such as a femto cell, a nano cell, a pico cell and a micro cell. Classification of the small cells as an example is shown in Table 1. Note that the technology according to the present disclosure can be also applied to types of cells not shown in Table 1.

TABLE 1

| Classification of small cells | | | |
|---|---|---|---|
| Category | IF example | Accommodation rate | Access type |
| Pico cell | S1, X2 | High | Open |
| Femto cell | X2 tunneling | Middle | Open/Closed |
| RRH | Optical fiber | High | Open |
| Hot zone | S1, X2 | High | Open |
| Relay station | Air IF | High | Open |

In Table 1, the "category" shows a small cell itself or a type of a small cell base station. The "IF example" shows an example of a communication interface (or a communication medium) usable by the small cell base station to communicate with a macro cell station or other control nodes. The pico cell can communicate, for example, with a control node within a core network via the S1 interface, and with other base stations via the X2 interface. The femto cell can communicate with other base stations by using the X2 tunneling protocol. The remote radio head (RRH) can communicate with the macro cell base station via the optical fiber. Similarly to the pico cell, the hot zone base station can communicate with the control node within the core network via the S1 interface, and with other base stations via the X2 interface. The relay station can communicate with the macro cell base station via the air interface. The "accommodation rate" is an index indicating how many mobile stations (corresponding to UEs in the LTE system referred to also as mobile stations) one cell can accommodate. The accommodation rate of the femto cell is slightly lower compared with those of the pico cell, the RRH, the hot zone base station and the relay station. The "access type" is classification relating to acceptance of access from the terminals. All of the terminals can be connected to the cells of the open access type in principle, while only the previously-registered terminal can be connected to the cells of the closed access type in principle.

In the heterogeneous network 1 exemplified in FIG. 1, a position of the terminal changes over time. A communication environment in the inside of the macro cell may change due to a fading, a shadowing, or the like. Therefore, although the small cell 12a and the small cell 12b are arranged in the heterogeneous network 1 in order to improve communication efficiency, the arrangement of these small cells is not always optimal over a long time of period. For example, in the example of FIG. 1, a region 16a is crowded with the plurality of terminals. Therefore, if an access point for a new small cell is arranged in the region 16a, the communication efficiency would be further improved as a result of the fact that the new small cell accommodates many terminals. Further, since a region 16b is positioned behind an obstacle 15 when viewed from the base station BS1, even when the terminal existing in the region 16b is connected to the macro cell 11, only poor communication quality is obtained. Therefore, the communication efficiency would be also improved by arranging an access point for a new small cell accommodating the terminal existing in the region 16b.

In order to configure such dynamic small cells, the technology according to the present disclosure utilizes the dynamic AP described above. Classification of the dynamic APs as an example is shown in Table 2. Note that the technology according to the present disclosure can be also applied to dynamic APs not shown in Table 2.

TABLE 2

Classification of dynamic access points (AP)

| Category | IF example | AP function | Battery | Accommodation rate | Access type |
|---|---|---|---|---|---|
| Mobile router terminal | Air IF | Unique | Large | Low | Open/closed |
| General terminal | Air IF | Download | Small | Low | Open/closed |

In Table 2, the "category" shows a type of the dynamic AP. The "IF example" shows an example of a communication interface usable by the dynamic AP to communicate with the base station or other control nodes. Both of the mobile router terminal and the general terminal can communicate with the base station via the air interface. The air interface herein may be a radio interface of a cellular system provided by the macro cell or the small cell. Instead, the dynamic AP may communicate with the base station via the air interface (and a wired network beyond the air interface) of a non-cellular system such as a wireless LAN, Bluetooth (registered trademark), or Zigbee (registered trademark). The "AP function" shows how to realize a function for operating as the access point. The mobile router terminal is a terminal previously mounting a unique access point function. The general terminal is a terminal operable as the access point by downloading a function module for the access point function in an ex-post manner. The "battery" shows an average size of battery capacity of the terminal. The battery capacity of the mobile router terminal is often greater than that of the general terminal. The "accommodation rate" is an index showing how many terminals one AP can accommodate. Compared with the various base stations described above, typically, the accommodation rate of the dynamic AP is low. The "access type" is classification relating to acceptance of access from the terminal. The access type of the dynamic AP may be the open access type, or may be the closed access type.

[1-2. Explanation of Problem]

Figure 2:
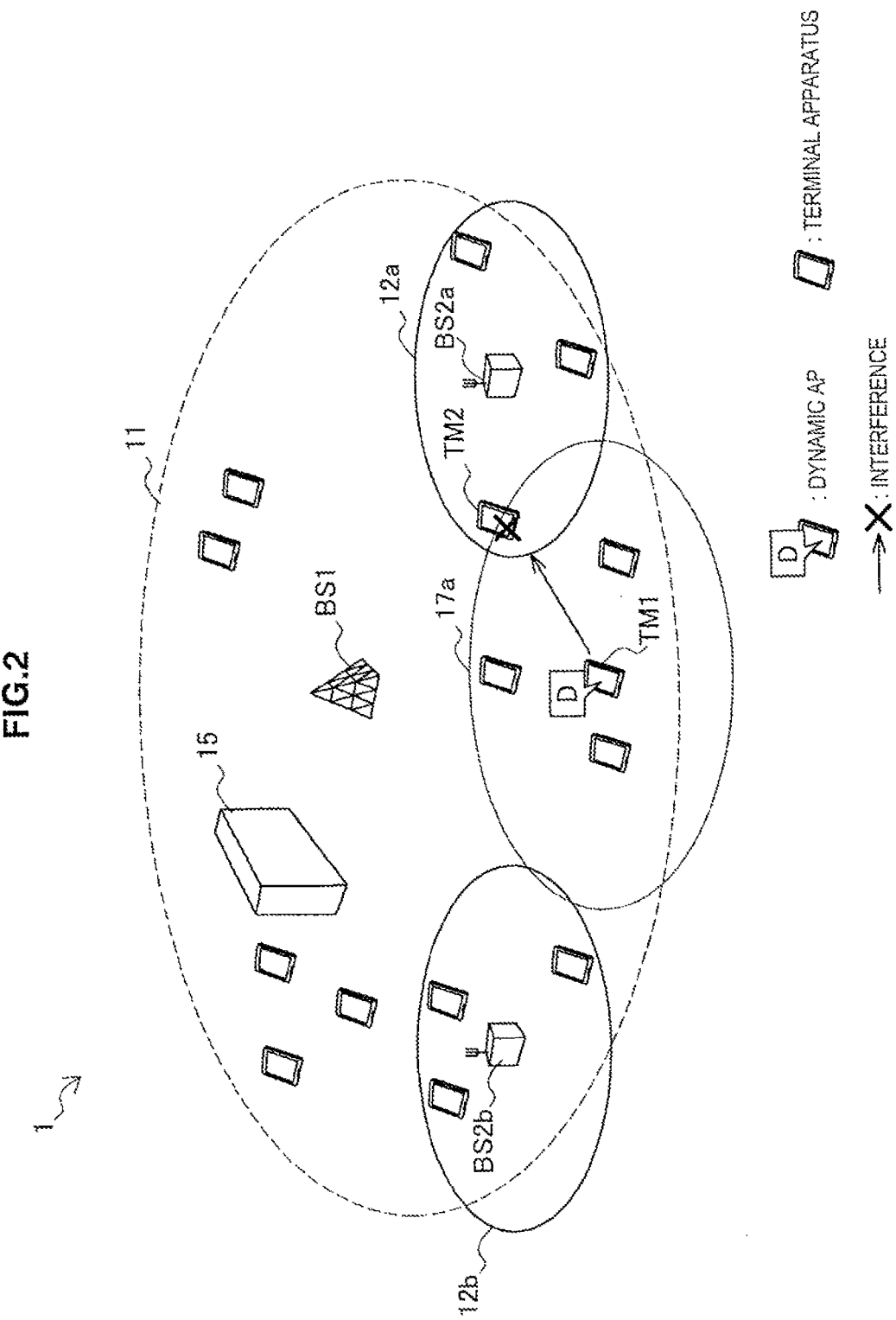
FIG. 2 is a first explanatory diagram for explaining an existing method for setting coverage of a dynamic AP.
Figure 3:
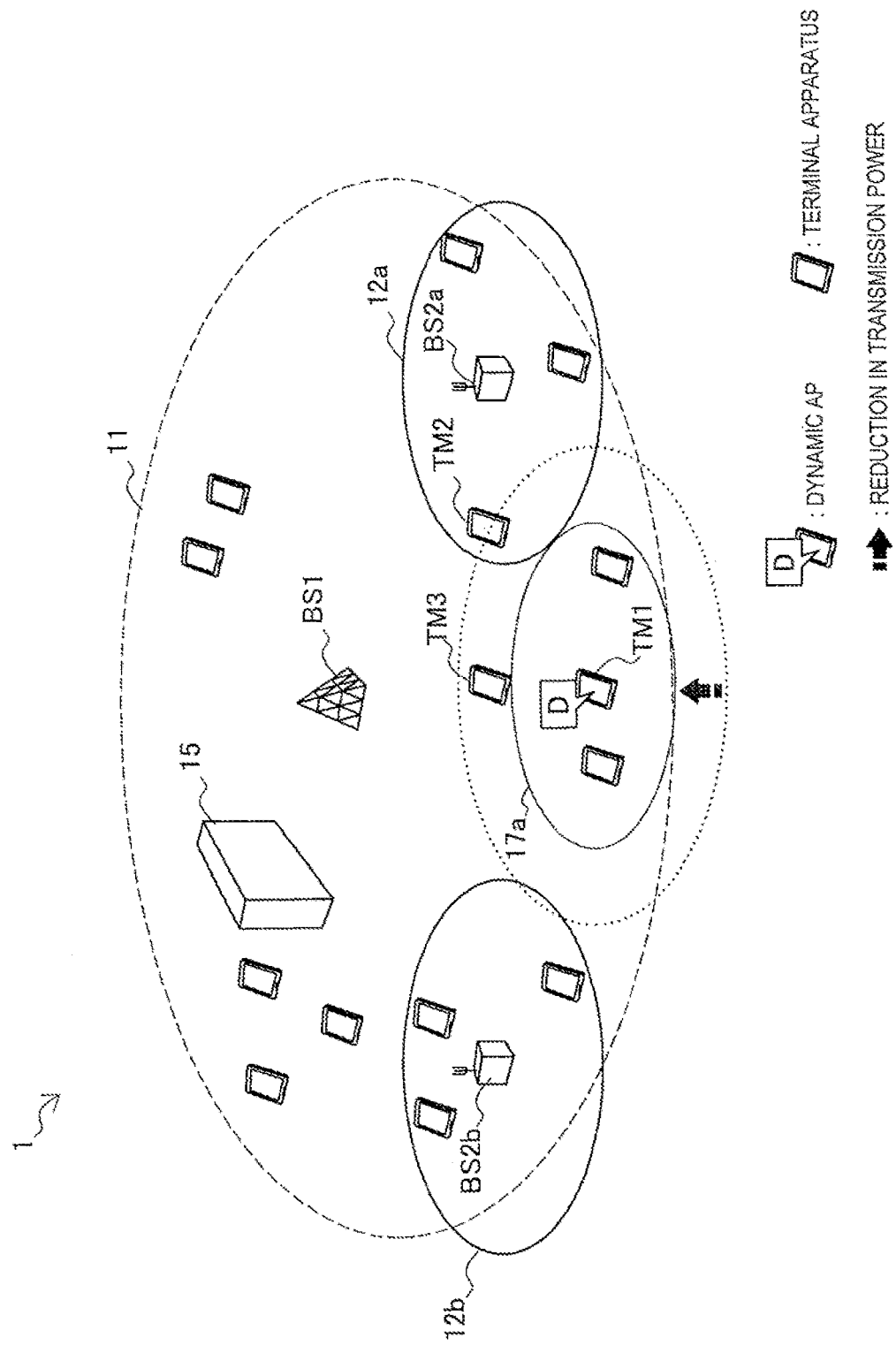
FIG. 3 is a second explanatory diagram for explaining the existing method for setting the coverage of the dynamic AP.
Figure 4:
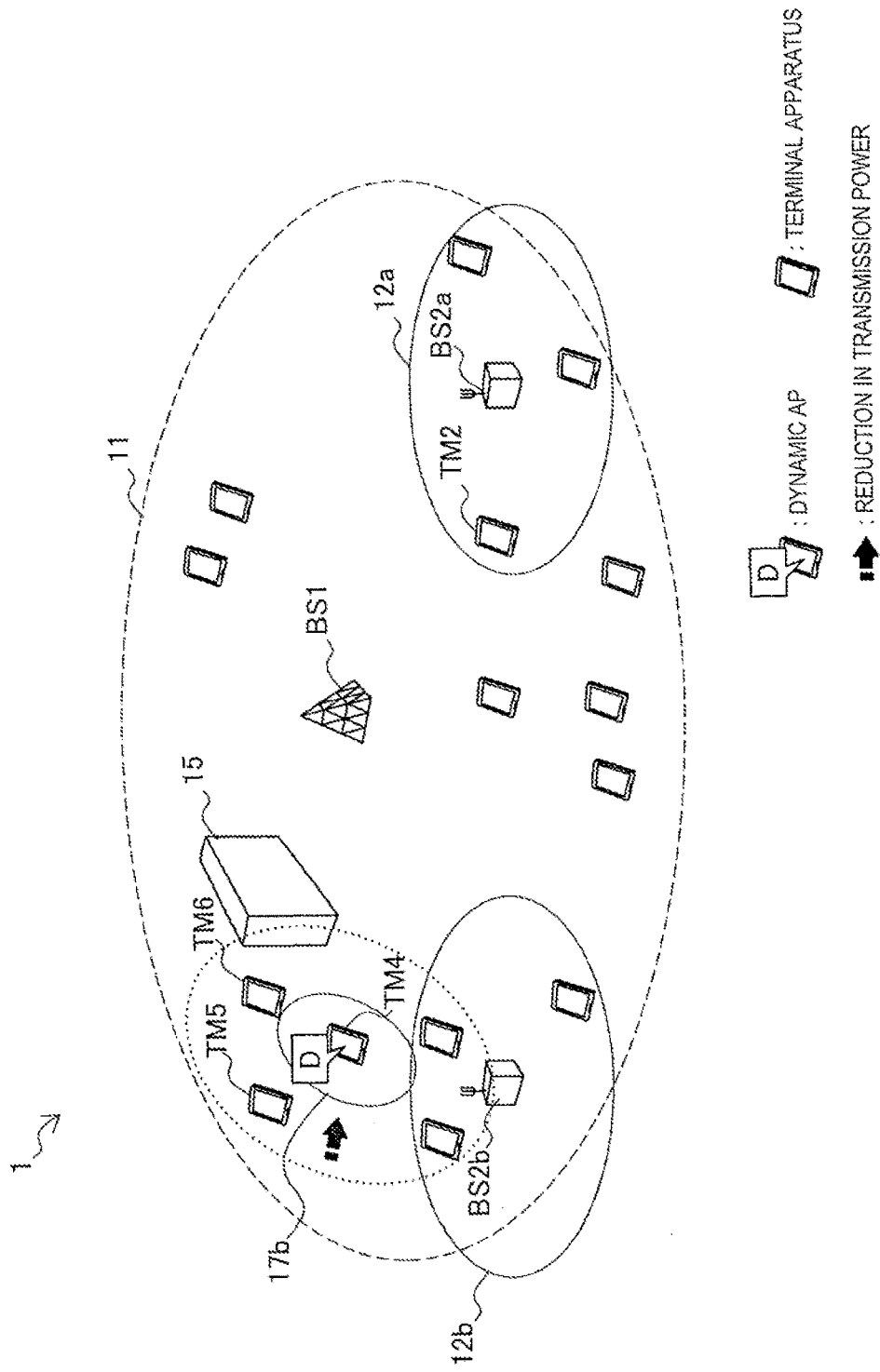
FIG. 4 is a third explanatory diagram for explaining the existing method for setting the coverage of the dynamic AP.

FIG. 2 to FIG. 4 are explanatory diagrams for explaining an existing method for setting coverage of the dynamic AP. With reference to FIG. 2, in the heterogeneous network 1, a terminal apparatus TM1 tries to operate as the dynamic AP to operate a new small cell 17a. However, since the coverage of the small cell 17a is too large, a radio signal from the terminal apparatus TM1 (or a terminal connected to the small cell 17a) may give harmful interference to a terminal apparatus TM2 connected to the existing small cell 12a. Then, the terminal apparatus TM1 reduces its transmission power to avoid the interference.

With reference to FIG. 3, as a result of the reduction in transmission power of the terminal apparatus TM1, the coverage of the small cell 17a is reduced, so that the interference to the terminal apparatus TM2 is avoided. However, a terminal apparatus TM3 that has been included in the coverage of the small cell 17a in the example of FIG. 2 is excluded from the coverage of the small cell 17a in the example of FIG. 3.

With reference to FIG. 4, in the heterogeneous network 1, a terminal apparatus TM4 tries to operate as the dynamic AP to operate a new small cell 17b. The terminal apparatus TM4 reduces its transmission power in order to avoid the harmful interference to a terminal connected to the existing small cell 12b. As a result, the coverage of the small cell 17b is reduced, so that terminal apparatuses TM5 and TM6 that are affected by shadowing caused by an obstacle 15 are excluded from the coverage of the small cell 17b. In the example of FIG. 4, since a terminal that can be accommodated by the small cell 17b does not exist, it no longer makes sense to operate the new small cell 17b. However, actually, communication efficiency as a whole network may be more improved when the existing small cell 12b is stopped or the coverage of the small cell 12b is reduced, and then the terminal apparatus TM14 operates the small cell 17b with wider coverage (a dotted line in the figure). That is, such a conservative method as to uniformly avoid the inference to the existing cells is not desirable in that the optimal arrangement of the cells can be prevented as a result from being realized.

Then, there will be described in detail from the next section an exemplary embodiment for solving the above-described problem and realizing the optimal arrangement of the cells when the dynamic AP is utilized.

<2. Configuration of Networking Control Node>

In order to determine the optimal arrangement of the cells when utilizing the dynamic AP under the heterogeneous network environment, it can be required to understand topology of the network and capability of each apparatus. This is not easy for the individual terminal apparatuses. Then, the technology according to the present disclosure introduces a networking control entity (NCE) as a new function entity for supporting formation of the network including the small cells described above. The networking control entity determines, for example, an area suitable for installation of the new small cell (hereinafter referred to as a small cell installation area) in terms of the communication efficiency of the whole network. The networking control entity then instructs the terminal apparatus operable as the dynamic AP existing within the small cell installation area to start the operation of the small cell. The networking control entity, when determining, the small cell installation area, selects a protection target cell to be protected from the interference caused by the new small cell, instead of uniformly avoiding the interference to the existing cells.

In this specification, a node mounting the networking control entity is called a networking control node. The networking control node may be mounted in any communication node. In terms of accessibility from the terminal, it is advantageous that the networking control node is mounted as one function of the base station, the control node on the core network, or a server on the Internet. In this section, as an example, the networking control node is mounted on the control node (for example, a mobility management entity (MME), a serving gateway (S-GW) or a PDN gateway (P-GW), or a dedicated node for the NCE) on the core network 13.

Figure 5:
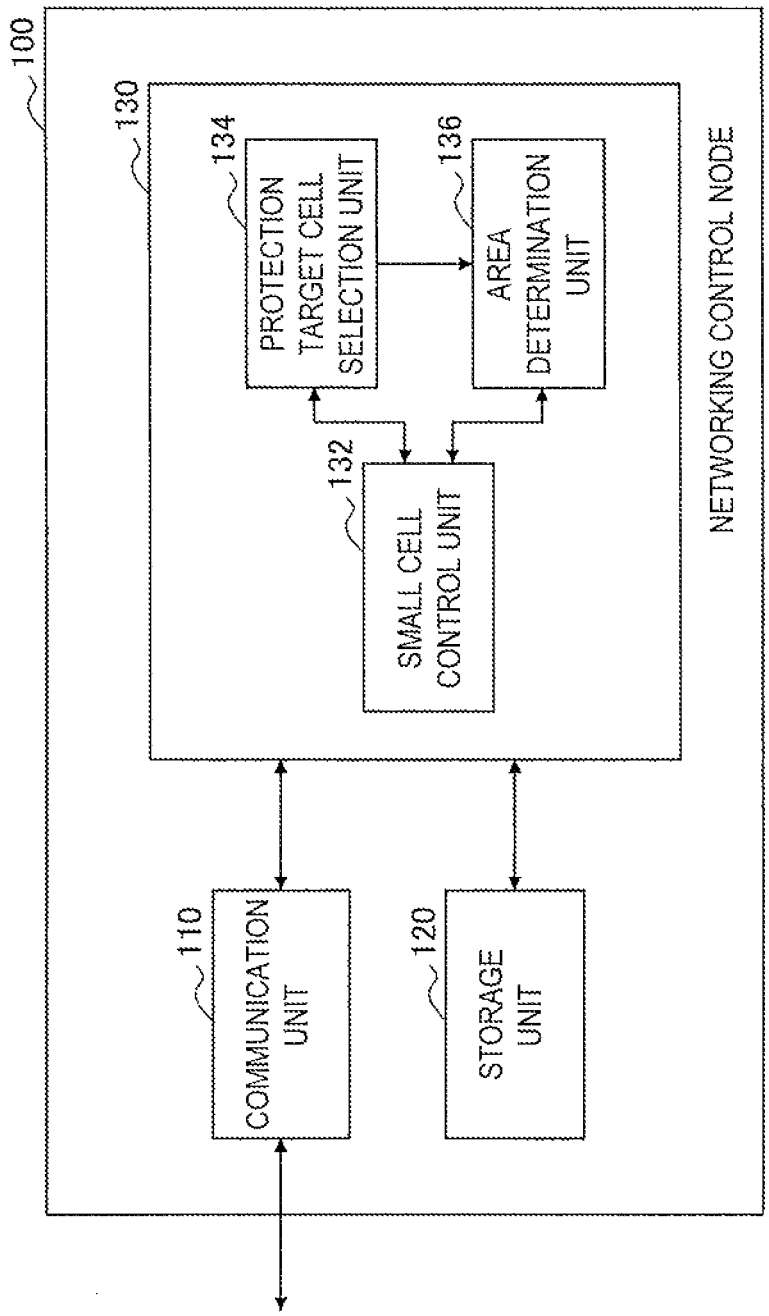
FIG. 5 is a block diagram illustrating an example of a configuration of a networking control node according to an embodiment.

FIG. 5 is a block diagram illustrating an example of a configuration of a networking control node 100 according to an embodiment. With reference to FIG. 5, the networking control node 100 includes a communication unit 110, a storage unit 120, and a control unit 130.

[2-1. Communication Unit]

The communication unit 110 is a communication interface allowing the networking control node 100 to communicate with other apparatuses. The communication unit 110 communicates with, for example, the various base stations connected to the core network 13 or the Internet 14. Further, the communication unit 110 communicates with the terminal apparatus via these base stations.

[2-2. Storage Unit]

The storage unit 120 stores a program and data for operation of the networking control node 100 by using a storage medium such as a hard disk or a semiconductor memory. The data stored b the storage unit 120 may include dynamic AP information, terminal information and existing cell information, which will be discussed later.

[2-3. Control Unit]

The control unit 130 controls overall operations of the networking control node 100 by using a processor such as a central processing unit (CPU) or a digital signal processor (DSP). In this embodiment, the control unit 130 includes a small cell control unit 132, a protection target cell selection unit 134, and an area determination unit 136.

(1) Small Cell Control Unit/Preparation Processing

The small cell control unit 132 identifies the dynamic AP operable as the access point for the small cell by signaling via the communication unit 110, and controls the operation of the small cell by the dynamic AP. Further, the small cell control unit 132, when the need for newly configuring the small cell exists, executes processing for arranging the small cell so that the communication efficiency is optimized as the whole network. More specifically, in this embodiment, the processing executed by the small cell control unit 132 is divided into preparation processing and main processing.

Figure 6:
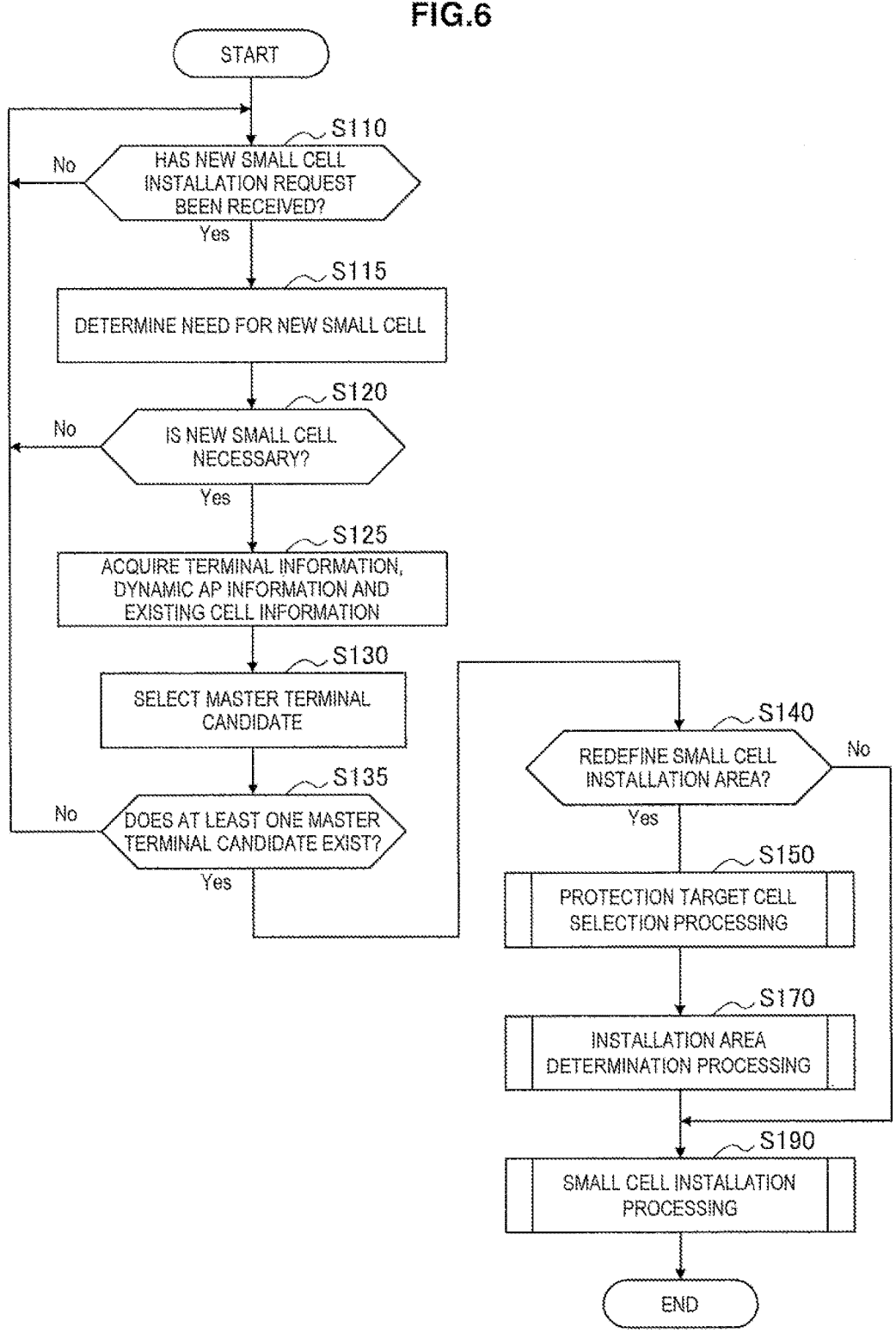
FIG. 6 is a flow chart illustrating an example of a flow of communication control processing that can be executed by the networking control node of FIG. 5.

FIG. 6 is a flow chart illustrating an example of a flow of communication control processing that can be executed by the networking control node 100. The processing at Step S110 to Step S135 of FIG. 6 corresponds to the preparation processing. The processing at Step S140 to Step S190 corresponds to the main processing.

The preparation processing mainly includes determination of the need for the new small cell, collection of information, and selection of a master terminal candidate. First, the small cell control unit 132 waits for reception a small cell installation request via the communication unit 110 (Step S110). For example, the small cell installation request may be received from a macro cell base station BS1 illustrated in FIG. 1 for the purpose of improvement in system capacity. Further, the small cell installation request may be received from a terminal apparatus experiencing poor communication quality for the purpose of improvement in communication quality.

The small cell control unit 132, when the small cell installation request is received, determines the need for the new small cell (Step S115). For example, the small cell control unit 132, for the purpose of improvement in system capacity, compares a capacity index, such as the number of terminals connected to the macro cell 11, a rate of the number of terminals connected thereto to an accommodated terminal upper limit of the macro cell 11, or a resource usage rate of the macro cell 11, with a predetermined determination threshold value. Then, the small cell control unit 132, when the result of the threshold comparison indicates that the capacity is tight, can determine that the need for the new small cell exists (that is, it is necessary to install the new small cell). Further, for example, the small cell control unit 132, for the purpose of improvement in communication quality it a specific terminal apparatus, compares a quality index, such as received signal strength indicator (RSSI), reference signal received quality (RSRQ), reference signal received power (RSRP), a bit error rate (BER), a frame error rate (FER) or a signal to noise (SN) ratio, with a predetermined determination threshold value. Then, the small cell control unit 132, when the result of the threshold comparison indicates that the communication quality is poor, can determine that the need for the small cell exists. The small cell control unit 132, instead of comparing the quality index of one specific terminal apparatus with the determination threshold value, compares a quality index indicating comprehensive communication quality of the specific terminal apparatus and terminal apparatuses positioned around the terminal apparatus (for example, see Formula (3) described below) with a determination threshold value. Here, when it is determined that the need for the new small cell does not exist, refusal to the small cell installation request is responded by the small cell control unit 132, and the processing returns to Step S110 (Step S120). When it is determined that the need for the new small cell exists, the processing proceeds to Step S125. Note that the small cell control unit 132 may monitor the system capacity or the communication quality of the individual terminal apparatuses to actively determine the need for the new small cell, regardless of the reception of the small cell installation request.

When the need for the new small cell exists, the small cell control unit 132 acquires terminal information, dynamic AP information and existing cell information that can be used for determining the optimal arrangement of the cells.

The terminal information may be acquired from each of the terminal apparatuses within the heterogeneous network 1, or may be acquired from the base station preliminarily holding the terminal information, or other network nodes. The terminal information may include at least one of the information items listed as follows:

a) Terminal identifier
b) Position data
c) Communication history data
d) Capability data
e) Communication quality data f) Remaining battery level data
g) Mobility data A position of each terminal apparatus may be determined according to any positioning method. For example, any of positioning methods such as assisted-global navigation satellite systems (A-GNSS), an observed time difference of arrival (OTDOA), or an enhanced-cell ID (E-CID), which is supported after the 3GPP Release 9, may be used for determining the position of each terminal apparatus.

The communication history data is data indicating a past communication amount of each terminal apparatus (for example, a transmitting traffic amount and a receiving traffic amount for each fixed period).

The capability data may be a simple graph indicating whether each terminal apparatus can operate as the dynamic AP or not. Instead, the capability data may indicate at least one of processor performance, a memory size, the number of antennas and a terminal class (specified by the 3GPP) of each terminal. In a case of the latter, the small cell control unit 132 can identify, as the dynamic AP, the terminal apparatus in which the capability data satisfies an operation requirement of the dynamic AP.

The communication quality data is data indicating communication quality measured by each terminal apparatus. The communication quality data may indicate at least one of the above-described RSSI, RSRQ, RSRP, BER, FER, and S/N ratio. The terminal apparatus that does not have communication quality exceeding a predetermined threshold value may be excluded from master terminal candidates for operating the small cell.

The remaining battery level data is data indicating the latest remaining battery level of each terminal apparatus. The remaining battery level data may include a flag indicating whether each terminal apparatus is connected to an external power supply. The terminal apparatus that is not connected to the external power supply and does not have a remaining battery level exceeding a predetermined threshold value may be excluded from the master terminal candidates for operating the small cell.

The mobility data is data indicating a mobility status of each terminal apparatus. For example, the mobility data may be able to identify two kinds of statuses of "no movement" and "during movement", or may be able to identify more statuses such as "no movement", "during low-speed movement" and "during high-speed movement. The terminal apparatus having a specific mobility status (for example, "during high-speed movement") may be excluded from the master terminal candidates for operating the small cell.

The dynamic AP information may be acquired from each of the terminal apparatuses having capability as the dynamic AP, or may be acquired from the base station or other network nodes. The dynamic AP information may include at least one of the information items listed as follows:

h) User approval flag
i) Maximum transmission power
j) Accommodated terminal upper limit The user approval flag indicates whether or not a user of the dynamic AP has approved that each dynamic AP is used as the master terminal operating the small cell. When the user approval data indicates refuse of the use of a certain dynamic AP as the master terminal, the small cell control unit 132 may exclude the dynamic AP from the master terminal candidates.

The maximum transmission power indicates a maximum value of transmission power that each dynamic AP can output. The maximum transmission power can be used for determining coverage of the small cell when assuming that each dynamic AP operates the small cell.

The accommodated terminal upper limit indicates an upper limit of the number of terminals that can be accommodated in the small cell operated by each dynamic AP.

The existing cell information includes information on the macro cell and the existing small cell. The existing cell information on the macro cell may be acquired from the macro cell base station or other network nodes. The existing cell information on the existing small cell may be acquired from the small cell base station, or the master terminal, the macro cell base station or other network nodes, which operate each cell. The existing cell information may include at least one of the information items listed as follows:

k) Coverage data
l) Allowable interference level
m) Connection terminal list

The coverage data is data indicating coverage of each existing cell. The coverage data may include, for example, position coordinates and a cell radius of the base station (or the master terminal) of each existing cell. Instead, the coverage data may include polygon data indicating a more complicated geographical shape of the cell.

The allowable reference level indicates an upper limit of an allowable power level of an interference signal for each existing cell. The allowable interference level may indicate, typically, an allowable power level at the cell edge of each existing cell.

The connection terminal list is a list of a terminal identifier of the terminal apparatus being connected to each existing cell. The small cell control unit 132 can refer to the connection terminal list to identify which of the terminal apparatuses connects to each of the macro cell and the existing small cell.

Next, the small cell control unit 132 uses the acquired terminal information for each terminal apparatus to select master terminal candidates for operating the small cell (step S130). For example, the small cell control unit 132 identifies the terminal apparatus having capability operable as the access point, that is, the dynamic AP on the basis of the capability data described above. The small cell control unit 132 then selects, as the master terminal candidate, the apparatus in which the communication quality between itself and the macro cell, the remaining battery level or the mobility satisfies a predetermined reference from the identified dynamic APs. For example, the small cell control unit 132 may exclude, as described above, the dynamic AP that does not have the communication quality exceeding the predetermined threshold value, the dynamic AP that does not have the remaining battery level exceeding the predetermined value, or the dynamic AP moving at high speed, from the master terminal candidates.

Next, the small cell control unit 132 determines whether or not at least one master terminal candidate has been selected (Step S135). Here, when no master terminal candidates are selected, the new small cell is not installed and the communication control processing of FIG. 6 returns to Step S110. When the at least one master terminal candidate has been selected, the preparation processing ends, and the communication control processing of FIG. 6 proceeds to the main processing after Step S140.

As shown in FIG. 6, the main processing mainly includes the protection target cell selection processing, the installation area determination processing, and the small cell installation processing. The protection target cell selection processing and the installation area determination processing are executed when the small cell installation area is required to be redefined (Step S140).

When the small cell installation area is required to be redefined, the small cell control unit 132 allows the protection target cell selection unit 134 to execute the protection target cell selection processing (Step S150). As a result, the protection target cell to be protected from the interference caused by the new small cell newly configured is selected among the one or more existing cells. The protection target cell selection processing will be further described later using FIG. 9. Next, the small cell control unit 132 allows the area determination unit 131 to execute the installation area determination processing (Step S170). As a result, the small cell installation area is determined so that the interference to each of the selected protection target cells does not exceed an allowable interference level. The installation area determination processing will be further described later using FIG. 12.

The small cell control unit 132 then executes the small cell installation processing (Step S190). As a result, the new small cell is installed in the small cell installation area defined in advance or redefined at Step S170. The small cell installation processing will be further described later using FIG. 14.

(2) Protection Target Cell Selection Unit

The protection target cell selection unit 134 selects the protection target cell among the one or more existing cells by using information related to the dynamic AP collected by the small cell control unit 132 to execute the protection target cell selection processing. More specifically, in this embodiment, the protection target cell selection unit 134 selects the protection target cell on the basis of evaluation of communication efficiency for an assumed cell assumed to be operated by each of the master terminal candidates selected by the small cell control unit 132, and the existing cell having coverage overlapped with that of the assumed cell.

For example, the protection target cell selection unit 134 can simply determine the coverage of each assumed cell from maximum transmission power of the master terminal candidates operating the assumed cell. For example, a radius of the coverage can be calculated on the basis of an attenuation rate (as a function of a distance) depending on a channel frequency of each assumed cell, and the maximum transmission power. This makes it possible to identify the existing cell having the coverage overlapped with that of each assumed cell.

Figure 7:
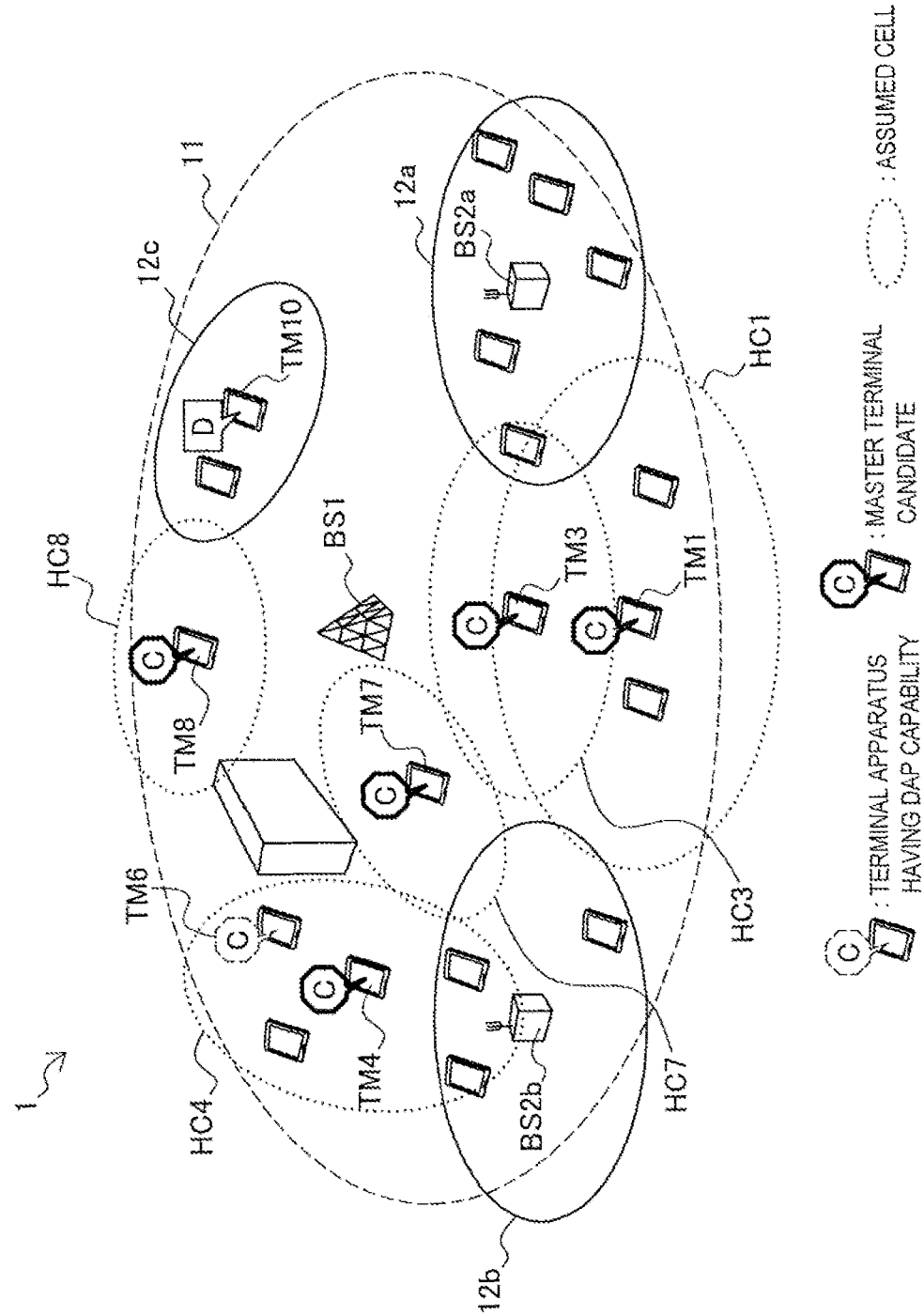
FIG. 7 is an explanatory diagram for explaining determination of coverage of an assumed cell.

FIG. 7 is an explanatory diagram for explaining determination of the coverage of the assumed cell. With reference to FIG. 7, in the heterogeneous network 1, a small cell base station BS2a operates the existing small cell 12a. A small cell base station BS2b operates the existing small cell 12b. A terminal apparatus TM10 as the dynamic AP operates the existing small cell 12c, as the master terminal. Further, five master terminal candidates TM1, TM3, TM4, TM7 and TM8 are selected. A terminal apparatus TM6 having the capability as the dynamic AP is excluded from the master terminal candidates due to its poor communication quality between itself and the macro cell. In the example of FIG. 7, the coverage of an assumed cell HC1 for the master terminal candidate TM1 is overlapped with those of the existing cell 12a and the existing cell 12b. The coverage of an assumed cell HC3 for the master terminal candidate TM3 is overlapped with that of the existing cell 12a. The coverage of an assumed cell HC4 for the master terminal candidate TM4 is overlapped with that of the existing cell 12b. The coverage of an assumed cell HC7 for the master terminal candidate is overlapped with that of the existing cell 12b. The coverage of an assumed cell HC8 for the master terminal candidate TM8 is overlapped with that of the existing cell 12c. The protection target cell selection unit 134 compares the communication efficiency between the pair of the assumed cell and the existing cell, having the coverages overlapped with each other.

In a first example, a communication efficiency index $E_1$ equals to an accommodated terminal count $N_{UE}$ as expressed by Formula (1) as follows. The accommodated terminal count $N_{UE}$ represents the number of terminal apparatuses positioned within the coverage of a certain one assumed cell or the existing cell. Note that, when the number of terminal apparatuses positioned within the coverage exceeds the accommodated terminal upper limit of the cell, the accommodated terminal upper limit, instead of the number of terminal apparatuses positioned within the coverage can be treated as the accommodated terminal count $N_{UE}$.

[Math. 1]

$$E_1 = N_{UE} \quad (1)$$

In a second example, a communication efficiency index $E_2$ equals to the sum of traffic amounts $Tf(UE_i)$ of accommodated terminals (in this specification, referred to as an accommodated terminal communication amount) as expressed by Formula (2) as follows. As the traffic amount $Tf(UE_i)$ for the i-th accommodated terminal, for example, a past communication amount indicated by communication history data of the accommodated terminal ($UE_i$) may be used, or a predicted value from the past communication amount may be used.

[Math. 2]

$$E_2 = \sum_{i=1}^{N_{UE}} Tf(UE_i) \quad (2)$$

In a third example, a communication efficiency index $E_3$ equals to the sum of the inverses of received signal strength indicators RSSI ($UE_i$) of accommodated terminals (in this specification, referred to as a quality total improvement degree) as expressed by Formula (3) as follows. The received signal strength indicator here is a value measured for a downlink signal of the macro cell. The more terminals having low received signal strength indicators are included in the cell, the higher the communication efficiency index $E_3$ indicates its value. That is, the high value of the communication efficiency index $E_3$ means that significant improvement in communication quality is expected as a whole b installing the small cell at that place. Instead of the RSSI, other kinds of quality indexes such as RSRQ, RSRP, BER, FER or a SN ratio may be used. Note that the BER and FER indicate that the smaller the values the better the quality. Therefore, when the BER or FER is used, the calculation of the inverse is not performed, and the sum of the values can be calculated as the quality total improvement degree.

[Math. 3]

$$E_3 = \sum_{i=1}^{N_{UE}} \frac{1}{RSSI(UE_i)} \quad (3)$$

The protection target cell selection unit 134 evaluates one or the combination of two or more of the communication efficiency indexes $E_1$, $E_2$ and $E_3$ for the assumed cell and the existing cell to be compared with each other. The protection target cell selection unit 134 may switch an evaluation reference of the communication efficiency according to the purpose of the installation of the small cell. For example, for the purpose of improvement in system capacity, the protection target cell selection unit 134 can preferentially use the communication efficiency index $E_1$ or $E_2$. On the other hand, for the purpose of improvement in communication quality of a specific terminal apparatus, the protection target cell selection unit 134 can preferentially use the communication efficiency index $E_1$.

The protection target cell selection unit 134 excludes, for example, the existing cell having poorer communication efficiency than that of the corresponding assumed cell (to be compared) from the protection target cells.

Figure 8A:
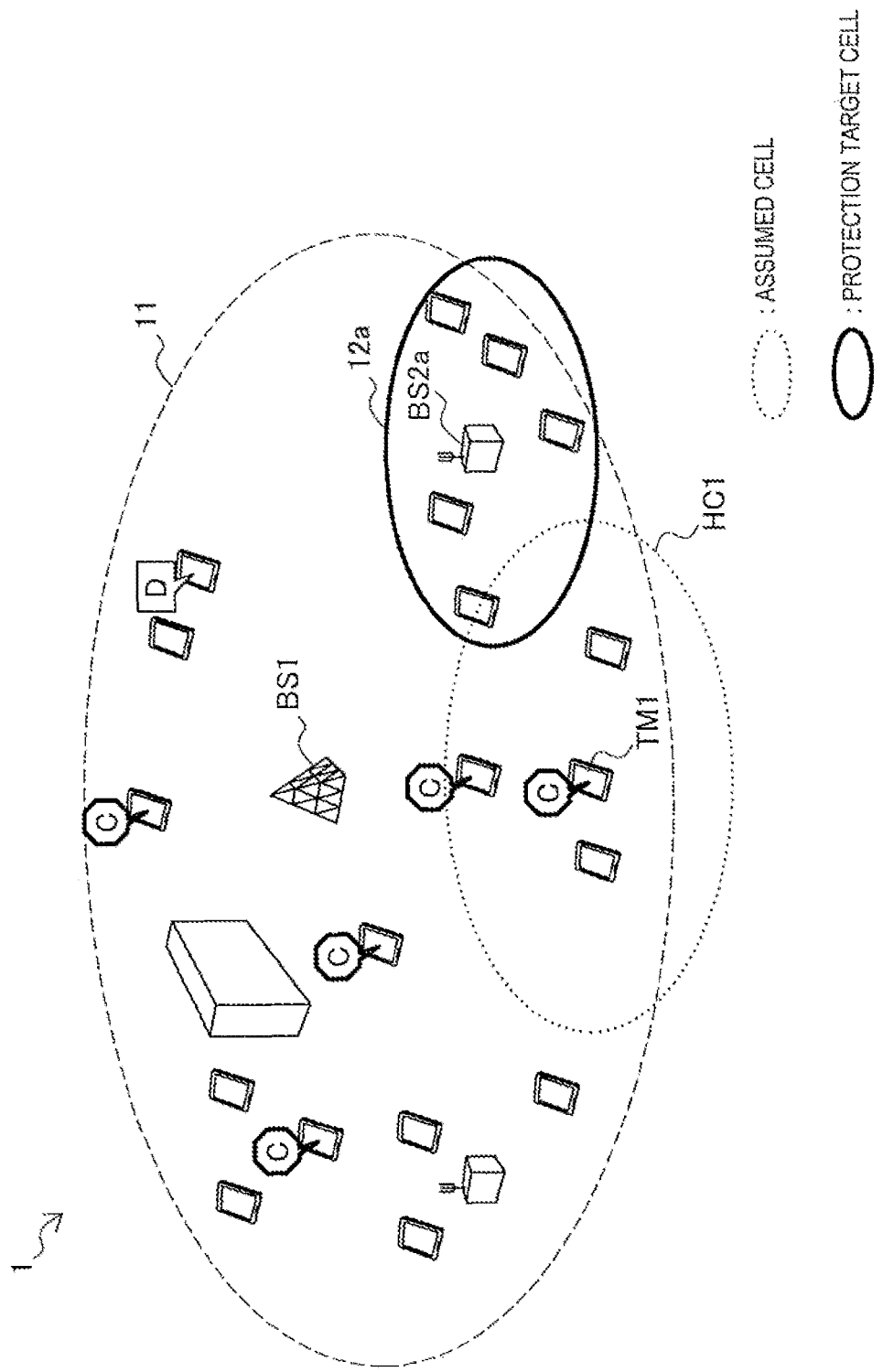
FIG. 8A is a first explanatory diagram for explaining selection of a protection target cell.

FIG. 8A is a first explanatory diagram for explaining selection of the protection target cell. With reference to FIG. 8A, the existing cell 12a and the assumed cell HC1 of FIG. 7 are illustrated. The existing cell 12a is the small cell operated by the small cell base station BS2a. The assumed cell HC1 is the small cell assumed to be operated by the master terminal candidate TM1. The coverages of the existing cell 12a and the assumed cell HC1 are overlapped with each other. Here, for example, the accommodated terminal count $N_{UE}$ of the existing cell 12a equals to 5. The accommodated terminal count $N_{UE}$ of the assumed cell HC1 equals to 3. In this case, since it is predicted that the existing cell 12a contributes to the communication efficiency as the whole network more than the assumed cell HC1, the protection target cell selection unit 134 does not exclude the existing cell 12a from the protection target cells.

Figure 8B:
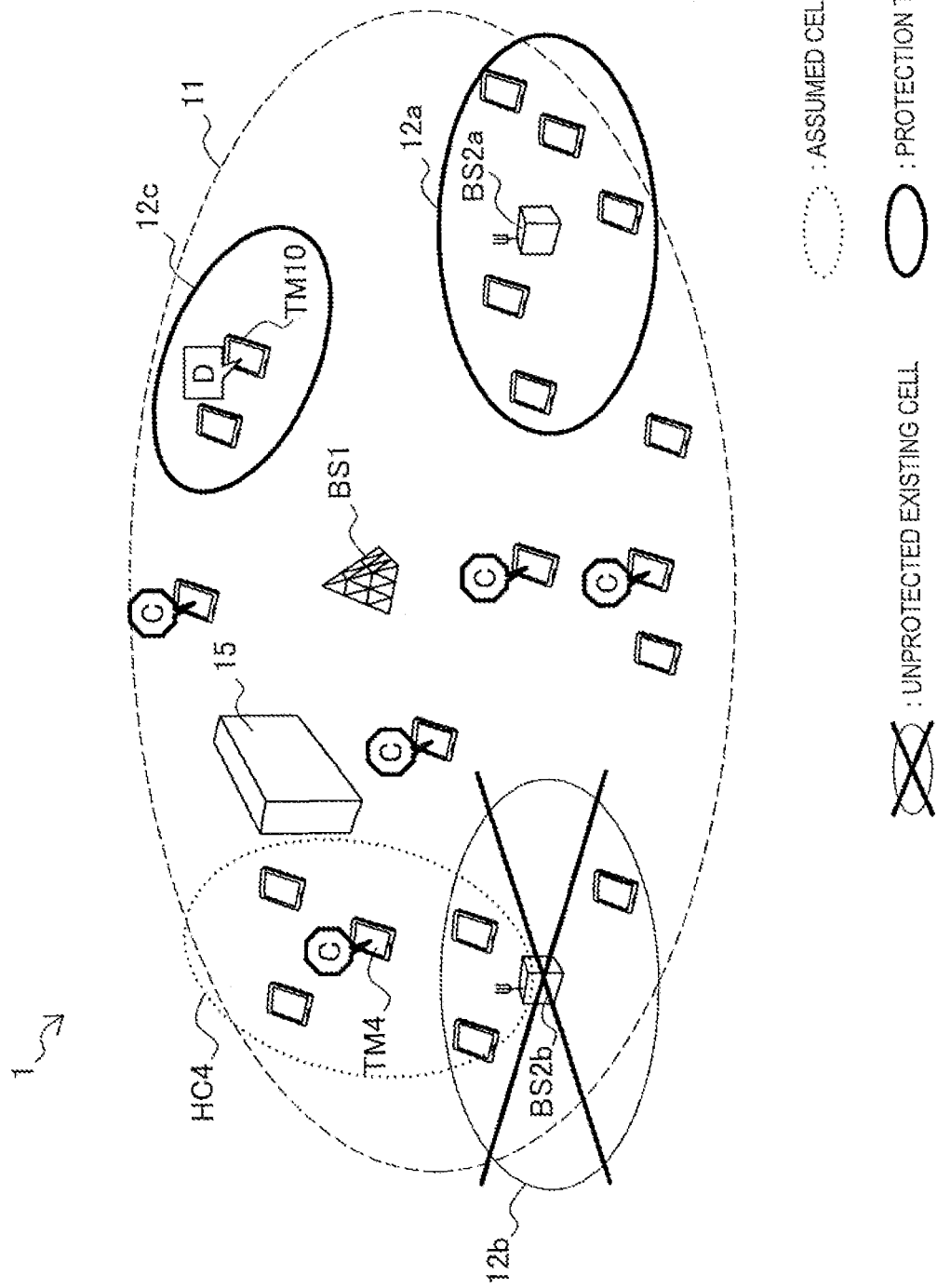
FIG. 8B is a second explanatory diagram for explaining the selection of the protection target cell.

FIG. 8B is a second explanatory diagram for explaining selection of the protection target cell. With reference to FIG. 8B, the existing cell 12b and the assumed cell HC4 of FIG. 7 are illustrated. The existing cell 12b is the small cell operated by the small cell base station BS2b. The assumed cell HC4 is the small cell assumed to be operated by the master terminal candidate TM4. The coverages of the existing cell 12b and the assumed cell HC4 are overlapped with each other. Here, for example, the accommodated terminal count $N_{UE}$ of the existing cell 12b equals to 3. The accommodated terminal count $N_{UE}$ of the assumed cell HC4 equals to 4. Further, the terminal apparatus affected by shading caused by the obstacle 15 is also included in the accommodated terminals of the assumed cell HC4. In this case, since it is predicted that the assumed cell HC4 contributes to the communication efficiency as the whole network more than the existing cell 12b, the protection target cell selection unit 134 excludes the existing cell 12b from the protection target cells. As a final result of the evaluation of the communication efficiency, in the example of FIG. 8B, the existing cell 12a and the existing cell 12c are selected as the protection target cells.

Note that the protection target cell selection unit 134, when the overlapping of the coverages of the existing cells having poorer communication efficiency than that of the corresponding assumed cell is resolved by reduction in transmission power of the existing cell, may include the existing cell into the protection target cells on the condition of the reduction in transmission power. When the coverage of the existing cell is reduced by the reduction in transmission power of the existing cell, the room for installing the new small cell is increased by an increment of the reduction. Accordingly, such a method is also beneficial.

Figure 9:
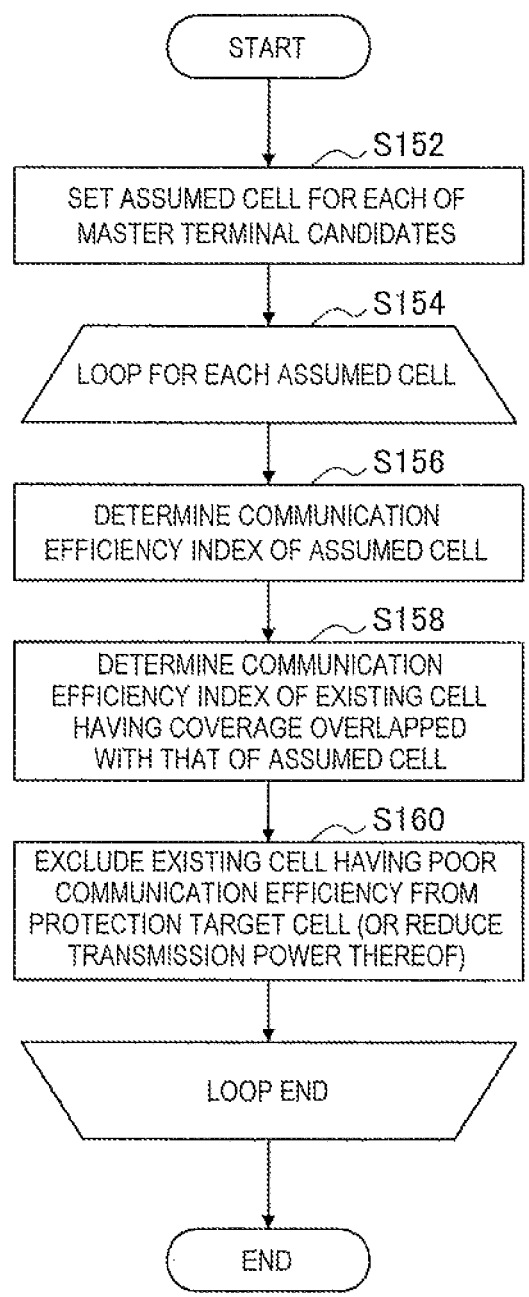
FIG. 9 is a flow chart illustrating an example of a detailed flow of the protection target cell selection processing of FIG. 6.

FIG. 9 is a flow chart illustrating an example of a detailed flow of the protection target cell selection processing described up to here. With reference to FIG. 9, first, the protection target cell selection unit 134 calculates a coverage radius for each of the master terminal candidates selected by the small cell control unit 132 on the basis of the maximum transmission power and the attenuation rate depending on the channel frequency, and sets the assumed call (Step S152). The subsequent processing at Step S156 to Step S160 is repeated for each assumed cell (Step S154).

In the repeat for each assumed cell, the protection target cell selection unit 134 first determines the communication efficiency index for the assumed cell to be processed (Step S156). Further, the protection target cell selection unit 134 determines the communication efficiency index of the existing cell having the coverage overlapped with that of the assumed cell to be processed (Step S158). The protection target cell selection unit 134 then excludes the existing cell having the poorer communication efficiency than that of the corresponding assumed cell from the protection target cells (or determines that the transmission power of the existing cell having the poorer communication efficiency is reduced) on the basis of the comparison of the communication efficiency indexes (Step S160). Finally, the existing cell that has not been excluded from the protection target cells by the protection target cell selection unit 134 can be treated as the protection target cell.

The interference to each of the protection target cells selected by the protection target cell selection unit 134 is controlled so as not to exceed the allowable level of each protection target cell on the subsequent installation of the new small cell. On the other hand, the interference to the existing cell excluded from the protection target cells is not considered in the subsequent installation of the new small cell. That is, in this embodiment, the interference to the existing cell is not uniformly avoided but only the interference to the protection target cell dynamically selected is avoided. The protection target cell is selected, as described above, in terms of the improvement in communication efficiency as the whole network. Then, while protecting the selected protection target cells, the other small cells are reconfigured to realize the optimal arrangement of the small cells.

(3) Area Determination Unit

The area determination unit 136 determines the small cell installation area where the new small cell can be installed, so that the interference to each of the protection target cells selected by the protection target cell selection unit 134 does not exceed the allowable level. This means that, in this embodiment, the new small cell is not directly installed on the basis of the selection result of the protection target cell, but the small cell installation area is first determined on the basis of the selection result of the protection target cell. Then, the master terminal for the new small cell is selected from the master terminal candidates existing within the small area installation area. The introduction of such a small cell installation area, for example, when the reason for disturbing the operation of the small cell is generated in the master terminal once selected, allows flexible operation of the network such as quickly switching the master terminal to another dynamic AP within the small cell installation area. Examples of the reason for disturbing the operation of the small cell may include quality deterioration of a backhaul link, a reduction in remaining battery level, or the occurrence of hardware obstruction or software obstruction. Under the condition of a high load of the master terminal, the selection of the additional master terminal within the same small cell installation area also allows the load to be distributed.

The area determination unit 136 performs, for example, scoring of the improvement communication efficiency when the new small cell is installed at each point of a plurality of points to be scanned within a certain scanning area, for each point, in order to determine the small cell installation area. As a result, the efficiency improvement score for each point is calculated. The scanning area here may be an geographical area. For example, the scanning area is equal to the coverage of the macro cell. Further, the coverage of the protection target cell may be excluded from the scanning area. Further, the scanning area may be limited to a partial region including a position of the terminal apparatus as a transmitting source of the small cell installation request. The points to be scanned within the scanning area may be points where the master terminal candidates are positioned, or points set regardless of the positions of the master terminal candidates (for example, points regularly arranged at constant intervals). The area determination unit 136 then determines the small cell installation area so that the small cell installation area includes points indicating the relatively good efficiency improvement score.

The efficiency improvement score may be calculated, for example, on the basis of at least one of the accommodated terminal count, the accommodated terminal communication amount, the access point candidate count and the size of the coverage of the new small cell when it is installed at each point. Here, the coverage of the new small cell is provisionally determined under the condition that the master terminal is positioned at each point, and the transmission power of the master terminal is reduced so as not to cause the harmful interference to each protection target cell.

Figure 10:
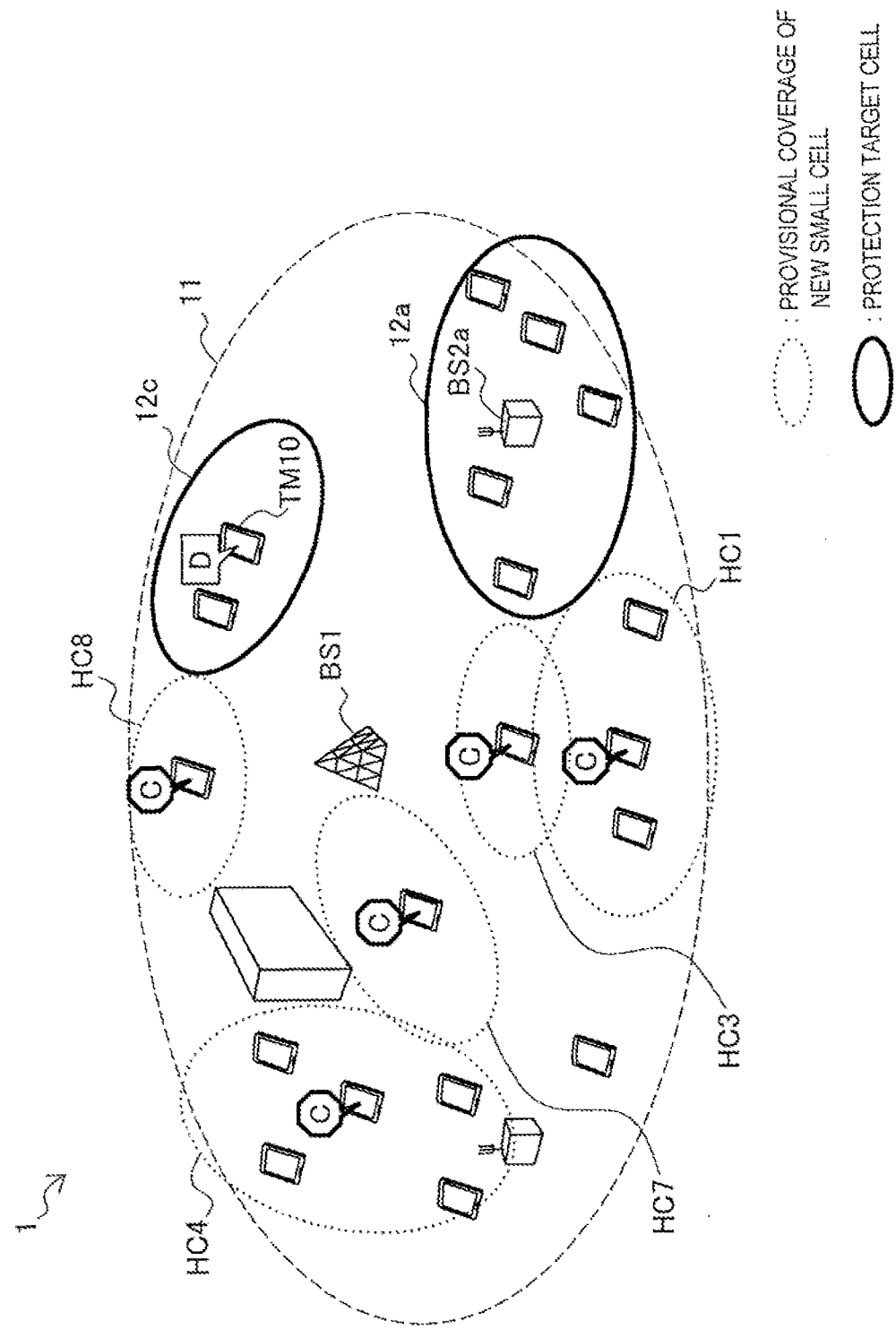
FIG. 10 is an explanatory diagram for explaining determination of provisional coverage for protecting the protection target cell.

FIG. 10 is an explanatory diagram for explaining determination of the provisional coverage for protecting the protection target cell. In the example of FIG. 10, for the convenience of the description, the point where the master terminal candidate is positioned is scanned by the area determination unit 136. In comparison of FIG. 10 with FIG. 7, the coverages of the assumed cells HC1 and HC3 are reduced so as to prevent the harmful interference to the protection target cell 12a. Further, the coverage of the assumed cell HC8 is reduced so as to prevent the harmful interference to the protection target cell 12b. By contrast, the coverage of the assumed cell HC4 is not reduced since the existing cell 12b is excluded from the protection target cells. The accommodated terminal count used in the calculation of the efficiency improvement score may be the number of the terminal apparatuses (accommodated terminals) positioned within the coverage determined in this manner. The accommodated terminal communication amount may be the sum of the traffic amounts for the accommodated terminals positioned within the coverage. The access point candidate count may be the number of dynamic APs positioned within the coverage (or around the center of the coverage). The size of the coverage may be the radius, area or the like of the coverage provisionally determined.

As an example, an efficiency improvement score $S_1$ can be calculated as expressed by Formula (4) as follows. In Formula (4), $M_{UE}$ is an accommodated terminal count, $Tf(UE_j)$ is a traffic amount of the j-th accommodated terminal. $M_{DAP}$ is an access point candidate count, and Co is a size of the coverage. Variables $w_1$, $w_3$ and $w_4$ multiplied by the respective terms of the right side of Formula (4) are weights that can be tuned in terms of optimization of the communication efficiency, and some weights may be zero.

[Math. 4]

$$S_1 = w_1 \cdot M_{UE} + w_2 \cdot \sum_{j=1}^{M_{UE}} Tf(UE_j) + w_3 \cdot M_{DAP} + w_4 \cdot Co \qquad (4)$$

The large value of the efficiency improvement score $S_1$ indicates that it is estimated that the improvement in communication efficiency when the new small cell is installed at the candidate point is large, for example, in terms of the system capacity. Therefore, when the new small cell is installed for the purpose of the improvement in system capacity, the use of the efficiency improvement score $S_1$ is beneficial.

As another example, the efficiency improvement score may be calculated, for example, on the basis of the quality index for each accommodated terminal of the new small cell when it is installed at each point. An efficiency improvement score $S_2$ can be calculated as expressed by Formula (5) as follows. Here, the received signal strength indicator RSSI $(UE_j)$ is a value measured for the downlink signal of the macro cell by the j-th terminal apparatus. Instead of the RSSI, other kinds of quality indexes such as RSRQ, RSRP, BER, FER or a SN ratio may be used. Note that, similarly to the case of Formula (3), when the BER or FER is used, the calculation of the inverse is not performed, and the sum of the values can be calculated as the efficiency improvement score.

[Math. 5]

$$S_2 = \sum_{j=1}^{M_{UE}} \frac{1}{RSSI(UE_j)} \qquad (5)$$

The large value of the efficiency improvement score $S_2$ indicates that it is estimated that the improvement in communication efficiency when the new small cell is installed at the candidate point is large, especially in terms of the communication quality of the terminal apparatus. Therefore, when the new small cell is installed for the purpose of the improvement in communication quality of the terminal apparatus, the use of the efficiency improvement score $S_2$ is beneficial.

Figure 11:
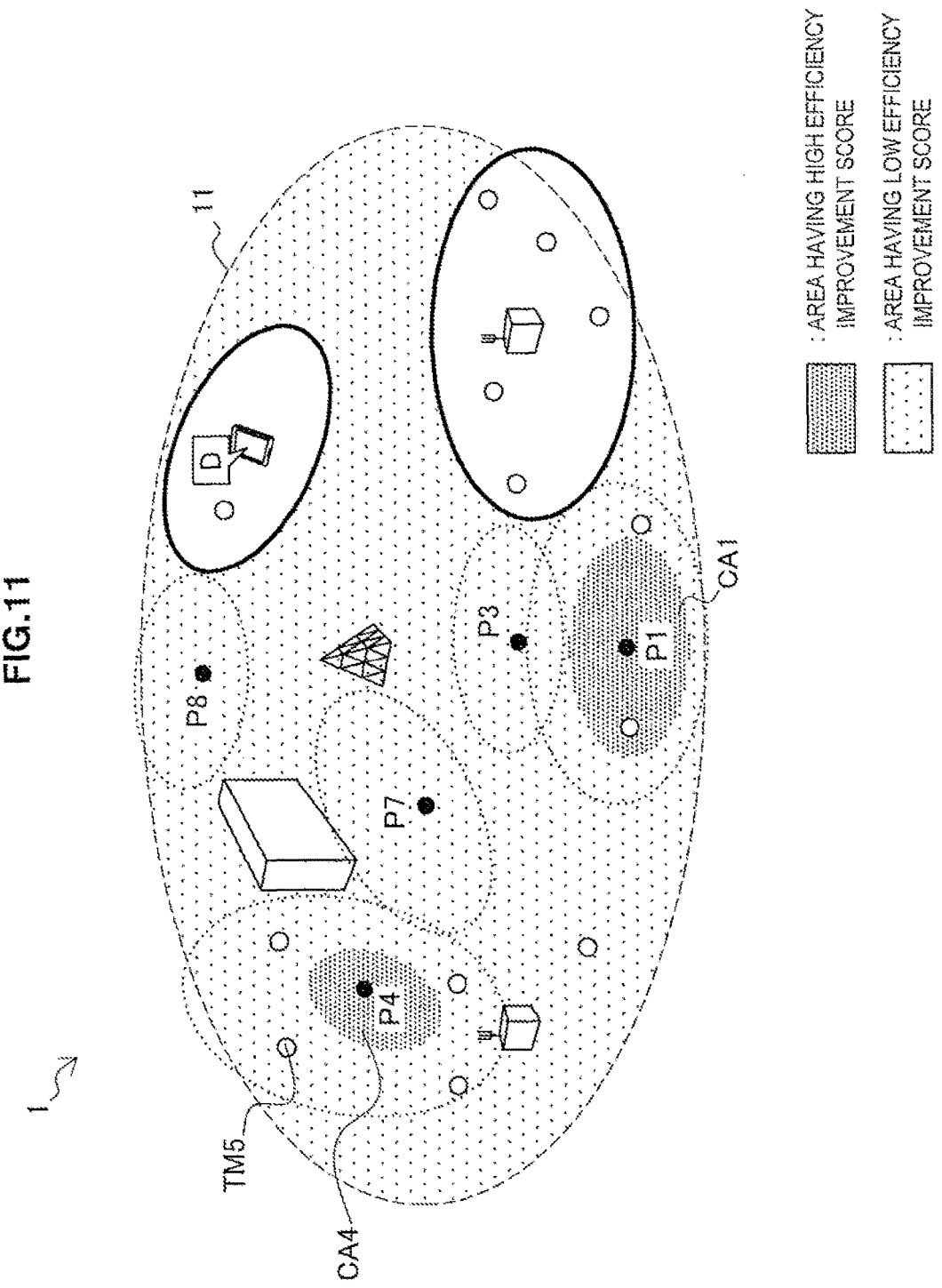
FIG. 11 is an explanatory diagram for explaining determination of a small cell installation area.

The area determination unit 136 determines the small cell installation area so that the small cell is installed in the region where the efficiency improvement score that can be calculated in this manner indicates a good value. FIG. 11 is an explanatory diagram for explaining determination of the small cell installation area. With reference to FIG. 11, the area where the efficiency improvement score calculated by the area determination unit 136 is high, is indicated by a thick shaded area, and the scanning area other than the area is indicated by a thin shaded area. In the example of FIG. 11, the efficiency improvement score indicates a relatively high value in an area CA1 including a point P1, and an area CA4 including a point P4. On the other hand, in the other areas such as points P3, P7 and P8, the efficiency improvement score indicates a relatively low value (for example, for the reason that the density of the adjacent terminals is low, or the terminals expected to be improved in communication quality are few). Therefore, the area determination unit 136 can determine the areas CA1 and CA4 as the small cell installation areas.

Note that the area determination unit 136, when it is requested that the improvement in communication quality for a specific terminal apparatus (for example, a terminal apparatus as a transmitting source of the small cell installation request) may determine the small cell installation area so that a current position of the specific terminal apparatus is included in the coverage of the new small cell. For example, in FIG. 11, when the terminal apparatus TM5 has transmitted the small cell installation request, the area determination unit 136 can determine only the area CA4 close to the terminal apparatus TM5 as the small cell installation area, thereby allowing the communication quality of the terminal apparatus being experiencing poor communication quality to be surely improved.

Moreover, the area determination unit 136 my determines the small cell installation area so that the predetermined number of dynamic APs is included in the small cell installation area. When the predetermined number is 1, at least one master terminal can be quickly secured within the small cell installation area in order to operate the new small cell. Further, when the predetermined number is 2 or more, in addition to the master terminal operating the new small cell, the dynamic AP for backing up the master terminal can be secured.

Figure 12:
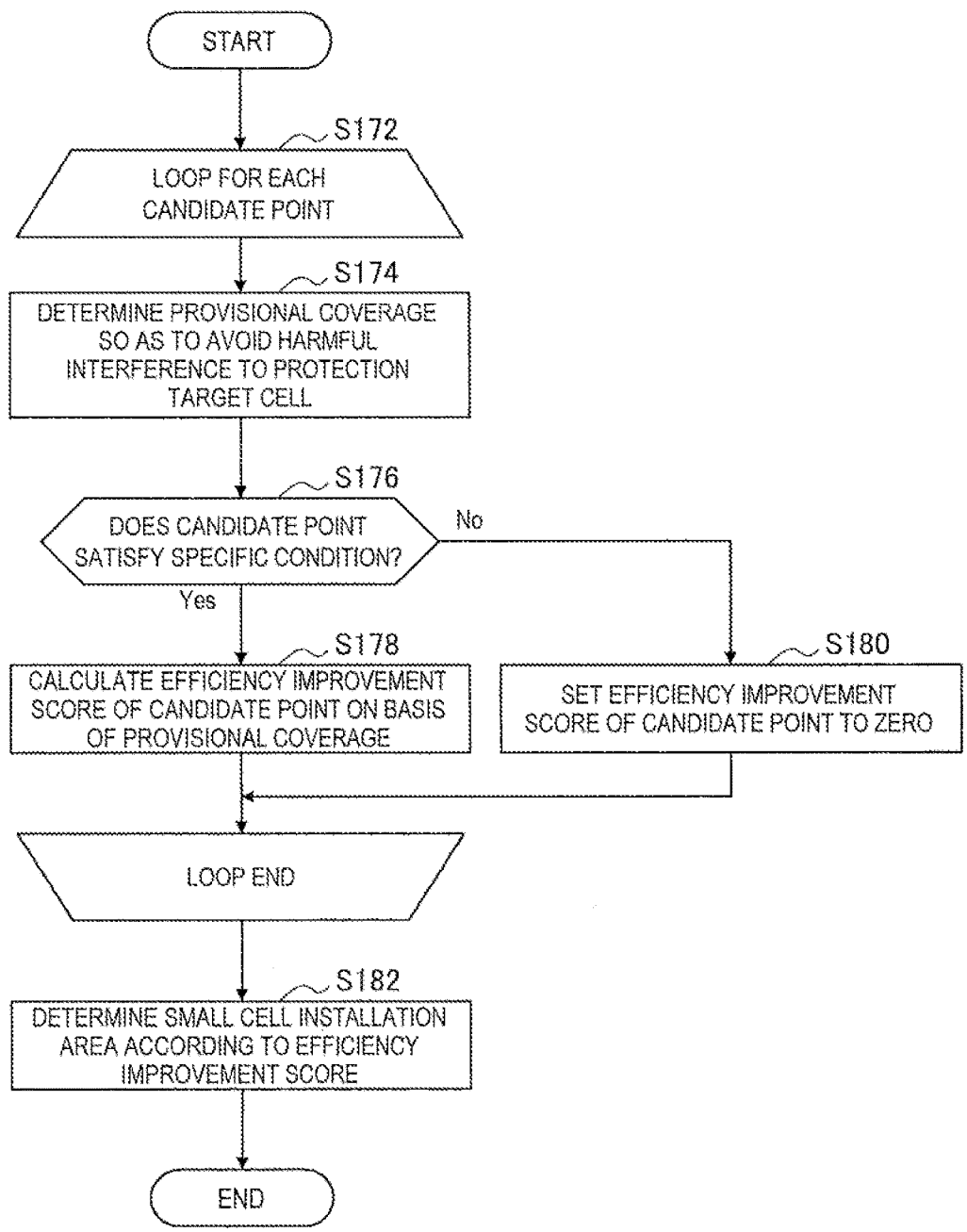
FIG. 12 is a flow chart illustrating an example of a detailed flow of the installation area determination processing of FIG. 6.

FIG. 12 is a flow chart illustrating an example of a detailed flow of the installation area determination processing described up to here. The processing at Step S174 to Step S180 of FIG. 12 is repeated for each candidate point within the scanning area (Step S172).

In the repeat for each candidate point, the area determination unit 136 determines the provisional coverage of the new small cell when it is installed at each candidate point so that the harmful interference to the protection target cell is avoided (Step S174). Next, the area determination unit 136 determines whether or not the candidate point satisfies a specific condition (Step S176). Here, the specific condition may be, for example, a condition that, when improvement in communication quality for a specific terminal apparatus is requested, a current position of the specific apparatus is included in the provisional coverage. Further, the specific condition may be a condition that the predetermined number of dynamic APs exists adjacent to the candidate points. The determination for the specific condition may be skipped. When the candidate points satisfy the specific condition (or the determination for the specific condition is skipped), the area determination unit 136 calculates the efficiency improvement scores of the candidate points on the basis of the coverage provisionally determined (Step S178). On the other hand, when the candidate points do not satisfy the specific condition, the area determination unit 136 can set the efficiency improvement scores of the candidate points to zero.

When the calculation of the efficiency improvement scores for all the candidate points is finished, the area determination unit 136 determines the small cell installation area according to the efficiency improvement scores (Step S182). The area determination unit 136 then allows the storage unit 120 to store data defining the determined small cell installation area.

(4) Small cell control unit/small cell installation processing

The small cell control unit 132 selects the dynamic AP existing at the position determined so that the interference to each of the protection target cells does not exceed the allowable level, as the master terminal, and instructs the selected master terminal to operate the new small cell. The master terminal is typically selected from the dynamic APs existing within the small cell installation area determined by the area determination unit 136. When coordinated multipoint (CoMP) transmission technology is utilized in the new small cell, the two or more master terminals may be selected.

The small cell control unit 132, when selecting the master terminal, transmits an instruction signal for instructing the operation start of the small cell, to the selected master terminal via the communication unit 110. The instruction signal may include, for example, operation information for designating a channel number of a frequency channel, an operation period, transmission power, radio access technology, a spectrum mask and an encryption system, for the new small cell. The transmission power of the new small cell is reduced if necessary so that the new small cell does not give the interference exceeding the allowable interference level to the protection target cell. The small cell control unit 132, when a response signal to the transmitted instruction signal is received from the master terminal, transmits a handover command for instructing handover to the new small cell to the terminal apparatus to be accommodated in the new small cell. Further, the small cell control unit 132 instructs the operation stop or the reduction in transmission power of the existing cell to the small cell base station or the dynamic AP operating the existing cell excluded from the protection target cell. As a result of such signaling, the arrangement of the small cells is reconfigured to realize the optimal arrangement of the small cells adapted to the latest condition.

Figure 13:
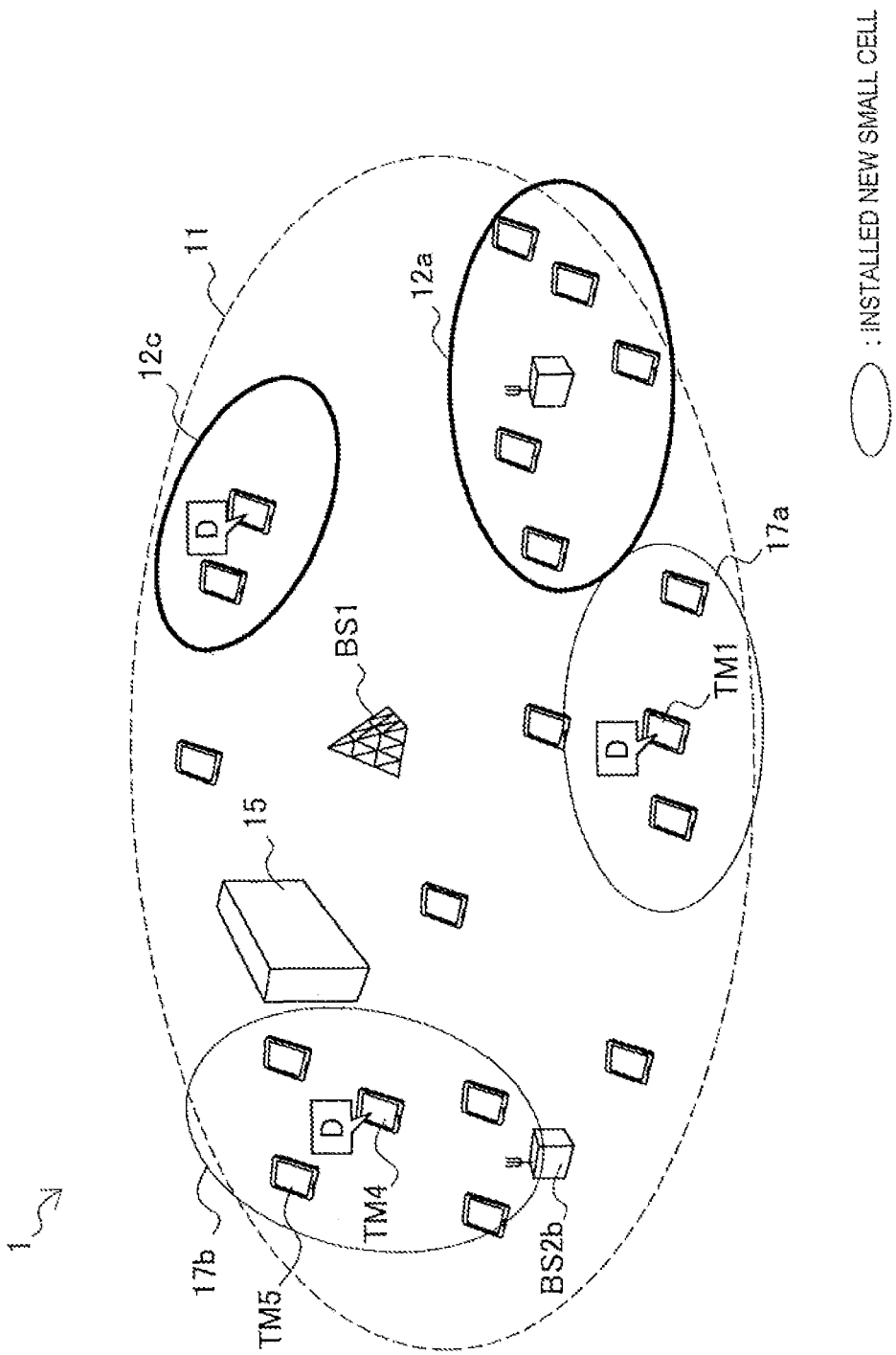
FIG. 13 is an explanatory diagram for explaining installation of a new small cell.

FIG. 13 is an explanatory diagram for explaining installation of the new small cell. With reference to FIG. 13, in the heterogeneous network 1, the new small cell 17a and the new small cell 17b are arranged. The new small cell 17a is operated by the master terminal TM1. The coverage of the new small cell 17a is limited so as to prevent the harmful interference to the protection target cell 12a. As a result of the fact that the two terminal apparatuses positioned adjacent to the master terminal TM1 is accommodated in the new small cell 17a, the system capacity of the heterogeneous network 1 is improved. The new small cell 17b is operated by the master terminal TM4. The existing cell 12b that had been operated by the small cell base station BS2b in the example of FIG. 7 is already stopped in the example of FIG. 13. The two terminal apparatuses that had been connected to the existing cell 12b are accommodated in the new small cell 17b. Further, as a result of the fact that the terminal apparatus (for example, the terminal apparatus TM5) that had experienced the poor communication quality caused by the obstacle 15 is accommodated in the new small cell 17b, not only that the system capacity is improved, but that the communication quality of these terminal apparatuses is improved. Such reconfiguration of the arrangement of the small cells allows the communication efficiency as the whole network to be significantly improved.

Figure 14:
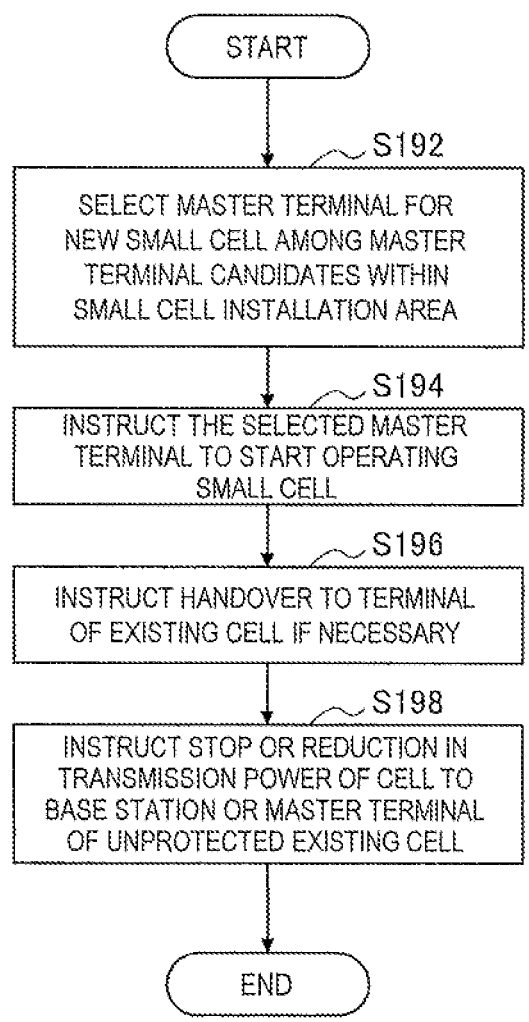
FIG. 14 is a flow chart illustrating an example of a detailed flow of the small cell installation processing of FIG. 6.

FIG. 14 is a flow chart illustrating an example of a detailed flow of the small cell installation processing described up to here. With reference to FIG. 14, the small cell control unit 132 first selects the master terminal to be operated for the new small cell, among the master terminal candidates within the small cell installation area (Step S192). The small cell control unit 132 may select the predetermined number of master terminals, for example, on the basis of various information such as the position, the capability, the communication quality, the remaining battery amount, the mobility, the maximum transmission power and the accommodated terminal upper limit of the master terminal candidates. Next, the small cell control unit 132 transmits the instruction signal for instructing the operation start of the small cell to the selected master terminal (Step S194). Next, the small cell control unit 132 transmits the handover command for instructing handover to the new small cell, to the terminal apparatus to be accommodated in the new small cell (for example, the terminal apparatus positioned within the coverage of the new small cell) (Step S196). Next, the small cell control unit 132 instructs the operation stop or the reduction in transmission power of the existing cell to the base station or the master terminal of the existing cell that is not protected (Step S198).

Note that the order of the processing steps described up to here using the flow chart may be different from the illustrated order. Further, some processing steps may be omitted or the additional processing steps may be adopted.

<3. Configuration of Dynamic AP>

Figure 15:
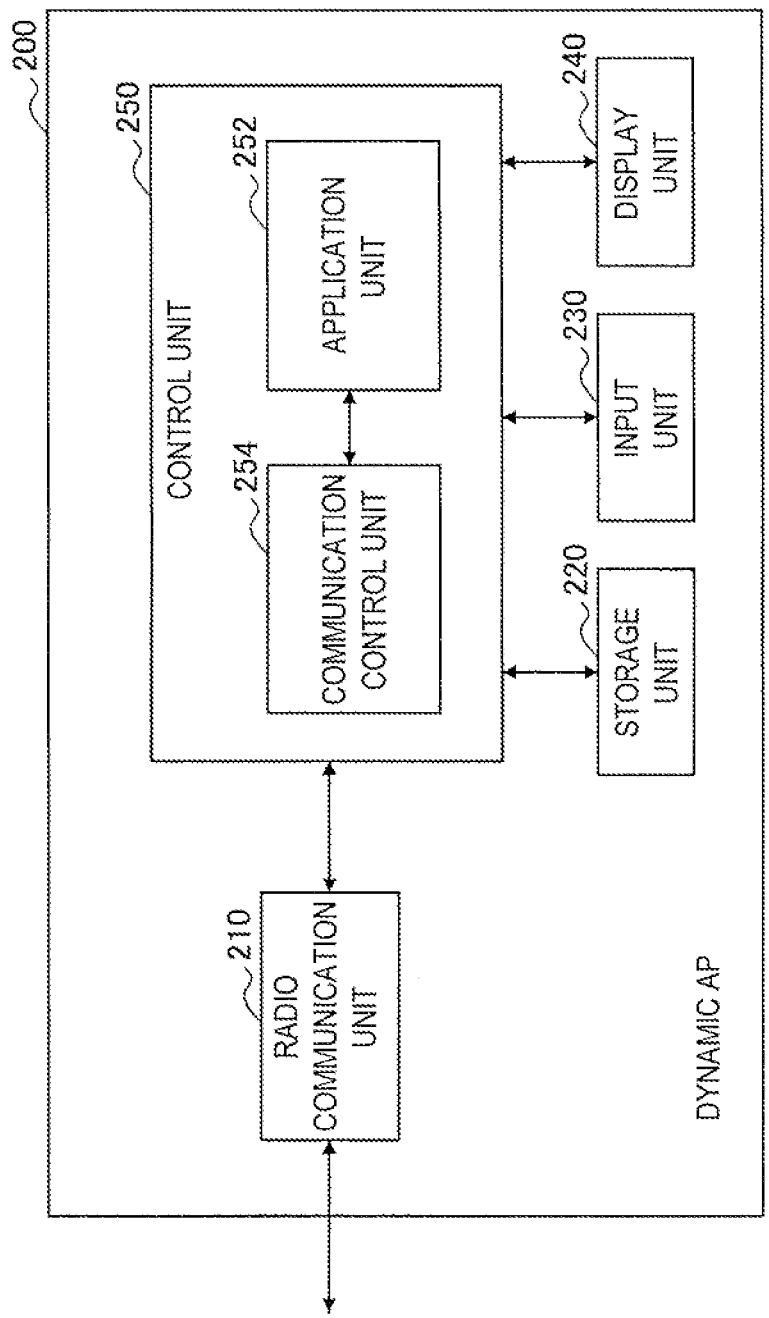
FIG. 15 is a block diagram illustrating an example of a configuration of a dynamic AP according to an embodiment.

FIG. 15 is a block diagram illustrating an example of a configuration of the dynamic AP 200 according to an embodiment. The dynamic AP 200 includes a radio communication unit 210, a storage unit 220, an input unit 230, a display unit 240, and a control unit 250.

[3-1. Radio Communication Unit]

The radio communication unit 210 is a radio communication interface for executing the radio communication by the dynamic AP 200. When the dynamic AP 200 operates as the terminal apparatus, the radio communication unit 210 establishes the radio connection between itself and any base station to transmit and receive the radio signal. When the dynamic AP 200 operates as the access point, the radio communication unit 210 further establishes the access link between itself and other terminal apparatus to transmit and receive the radio signal on the access link. The access link may be operated by a time division duplex (TDD) system or a frequency division duplex (FDD) system on a time-frequency resource that can be assigned by the networking control node 100 or the base station.

The radio communication unit 210 may previously have a unique mobile router function for operating as the access point. Instead, the radio communication unit 210 may operate as the access point by allowing a communication control unit 254 described later to execute a function module downloaded from an external server.

[3-2. Storage Unit]

The storage unit 220 stores a prop-am and data for the operation of the dynamic AP 200 by using a storage medium such as a hard disk or a semiconductor memory. The data stored by the storage unit 220 can include the information on the terminal apparatus described above, information on the dynamic AP, and the information on the connection-destination cell, and the like. The program stored by the storage unit 220 can include the function module for the mobile router function.

[3-3. Input Unit]

The input unit 230 includes one or more input devices for inputting information to the dynamic AP 200 by a user. The input unit 230 may include, for example, a touch sensor integrated with the display unit 240. Further, the input unit 230 may include other types of input devices such as a key pad, a button, a switch, or a wheel.

[3-4. Display Unit]

The display unit 240 is a display module configured by a liquid crystal display (LCD) or an organic light-emitting diode (OLED), or the like. The display unit 240 displays, for example, a setting screen for setting the operation of the dynamic AP 200 by a user. A user interface for allowing a user to set the above described user approval flag via the input unit 230 and the display unit 240 may be provided.

[3-5. Control Unit]

The control unit 250 controls the overall operation of the dynamic AP 200 by using the processor such as the CPU or the DSP. In this embodiment, the control unit 250 includes an application unit 252, and the communication control unit 254.

(1) Application Unit

The application unit 252 executes an application. The application executed by the application unit 252 can include, for example, a communication application such as a voice call client, an Internet browser, a mailer or an SNS client.

(2) Communication Control Unit

The communication control unit 254 controls the radio communication by the dynamic AP 200. For example, the communication control unit 254, when the dynamic AP 200 operates as the terminal apparatus, allows the radio communication unit 210 to transmit an uplink signal and allows the radio communication unit 210 to receive a downlink signal. Further, the communication control unit 254 exchanges the signaling between itself and the networking control node 100 described above. For example, the communication control unit 254, when, sufficient communication quality fair the communication application is not obtained, may transmit a small cell installation request to the networking control node 100.

In the case where the dynamic AP 200 exists within the small cell installation area, the dynamic AP 200 is potentially instructed from the networking control node 100 to operate the small cell as the master terminal. The communication control unit 254, when being instructed to operate the small cell from the networking control node 100, allows the radio communication unit 210 to operate as the access point for the small cell. The communication control unit 254 may refer to the user approval flag set in advance by a user in order to evaluate whether the operation of the small cell is approved by the user. The communication control unit 254, when the radio communication unit 210 does not have a unique mobile router function, may allow the radio communication unit 210 to operate as the access point by downloading a function module having a mobile router function from an external server and executing the downloaded function module. The communication control unit 254 may limit transmission power of the radio communication unit 210 so as to prevent the harmful interference to the protection target cell, according to the instruction from the networking control node 100. The communication control unit 254 then allows the radio communication unit 210 to relay traffic between the connection destination cell (typically, the macro cell) and the terminal apparatus.

<4. Processing Sequence>

FIG. 16A and FIG. 16B are sequence diagrams illustrating an example of a flow of the processing in the communication control system according to an embodiment. The communication control system to be described here can include one or more terminal apparatuses (UEs), one or more APs (DAPs), one or more base stations (BSs) of existing cells, and a networking control entity (NCE). Note that the networking, control entity may be mounted on the physically same apparatus as the macro cell base station, or may be mounted on the different apparatus. When the networking control entity is included in the macro cell base station, the signaling between the networking control entity and the macro cell base station can be omitted in the figure. The dynamic AP and the terminal apparatus managed by the networking control entity may be the terminal apparatus positioned within the macro cell.

With reference to FIG. 16A, first, for example, the macro cell base station can transmit the small cell installation request to the networking control entity (Step S10). Instead, the terminal apparatus may transmit the small cell installation request to the networking control entity (Step S12). The networking control entity, when receiving the small cell installation request, compares the above-described capacity index or quality index with a predetermined determination threshold value to determine the need for the new small cell (Step S14).

Next, the networking control entity, when it is determined that the need for the new small cell is present, collects the dynamic. AP-related information (Step S16). More specifically, the networking control entity can transmit an information request to the terminal apparatuses including the macro cell base station, the small cell base station and the dynamic AP to acquire the terminal information, the dynamic AP information and the existing cell information.

Next, the networking control entity uses the above-described terminal information to select the master terminal candidate for operating the small cell (Step S18). The master terminal candidate selected here may be an apparatus having the capability operable as the access point, and having the communication quality between itself and the macro cell, the remaining battery level or the mobility satisfying a predetermined reference.

Next, the networking control entity, when it is requested to redefine the small cell installation area, executes the protection target cell selection processing to select the protection target cell to be protected from the interference among the existing cells (Step S20). The networking control entity then executes the installation area determination processing to determine the small cell installation area so that the protection target cell is protected from the harmful interference (Step S22).

Next, with reference to FIG. 16B, the networking control entity selects the master terminal that should operate the new small cell, among the dynamic APs existing within the small cell installation area (Step S24). The networking control entity then instructs the selected master terminal to operate the new small cell (Step S26). The dynamic AP designated as the master terminal by the networking control entity starts operating the new small cell according to the instruction signal from the networking control entity (Step S28). The dynamic AP then reports the start of the operation of the new small cell to the networking control entity (Step S30).

Next, the networking control entity transmits the handover command to the terminal apparatus to be accommodated in the new small cell (Step S32). The terminal apparatus that has received the handover command executes handover from the existing macro cell or the small cell to the new small cell (Step S34). The terminal apparatus then reports the completion of the handover to the networking control entity (Step S36).

Next, the networking control entity, when the existing cell excluded from the protection target cell, or the existing cell added to the protection target cell on the condition of the reduction in transmission power exists, instructs the operation stop or the reduction in transmission power of the cell to the existing cell (Step S38). The base station (or the master terminal) of the existing cell that has received the instruction stops the operation of the existing cell or reduces the transmission power of the existing cell (Step S40). The base station (or the master terminal) then reports the completion of the instructed processing to the networking control entity (Step S42).

<5. Application Examples>

The technology of the present disclosure is applicable to various products. For example, the networking control node 100 may be realized as any type of server such as a tower server, a rack server, and a blade server. The networking control node 100 may be a control module (such as an integrated circuit module including a single die, and a card or a blade that is inserted into a slot of a blade server) mounted on a server.

For example, the networking control entity may be mounted on any type of evolved Node B (eNB) such as a macro eNB, and a small eNB. The small eNB may be an eNB that covers a cell smaller than a macro cell, such as a pico eNB, micro eNB, or home (femto) eNB. Instead, the networking control entity may be mounted on other types of base stations such as a NodeB and a base transceiver station (BTS). The eNB may include a main body (that is also referred to as a base station apparatus) configured to control radio communication, and one or more remote radio heads (RRH) disposed in a different place from that of the main body.

For example, the dynamic AP 200 may be realized as a mobile terminal such as a smartphone, a tablet personal computer (PC), a notebook PC, a portable game terminal, a portable/dongle type mobile router, and a digital camera, or an in-vehicle terminal such as a car navigation apparatus. The dynamic AP 200 may also be realized as a terminal (that is also referred to as a machine type communication (MTC) terminal) that performs machine-to-machine (M2M) communication. Furthermore, the dynamic AP 200 may be a radio communication module (such as an integrated circuit module including a single die) mounted on each of the terminals.

[5-1. Application Example Related to Networking Control Node]

Figure 17:
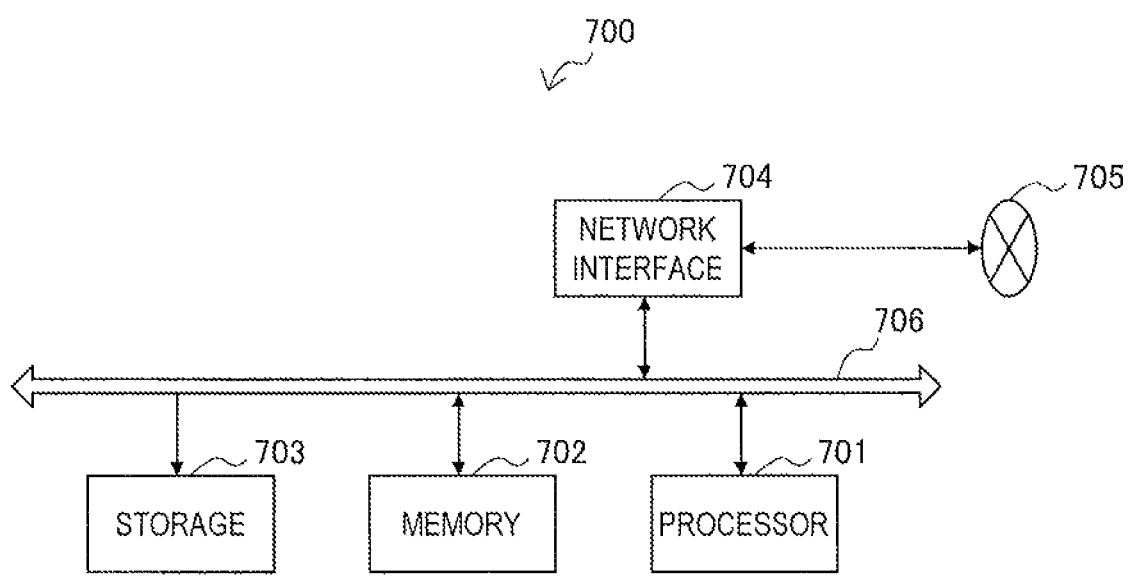
FIG. 17 is a block diagram illustrating an example of a schematic configuration of a server.

FIG. 17 is a block diagram illustrating an example of the schematic configuration of a server 700 to which the technology of the present disclosure may be applied. The server 700 includes a processor 701, a memory 702, a storage 703, a network interface 704, and a bus 706.

The processor 701 may be, for example, a central processing unit (CPU) or a digital signal processor (DSP), and controls functions of the server 700. The memory 702 includes a random access memory (RAM) and a read only memory (ROM), and stores a program that is executed by the processor 701 and data. The storage 703 may include a storage medium such as a semiconductor memory and a hard disk.

The network interface 704 is a wired communication interface for connecting the server 700 to a wired communication network 705. The wired communication network 705 may be a core network such as an evolved packet core (EPC), or a packet data network (PDN) such as the Internet.

The bus 706 connects the processor 701, the memory 702, the storage 703, and the network interface 704 to each other. The bus 706 may include two or more buses (such as a high speed bus and a low speed bus) each of which has different speed.

In the server 700 of FIG. 17, the small cell control unit 132, the protection target cell selection unit 134 and the area determination unit 136 described using FIG. 5 may be mounted on the processor 701. For example, the server 700 can determine the arrangement of the small cells so as to protect the protection target cell from the harmful interference to enhance the communication efficiency as the whole network.

[5-2. Application Examples Related to Base Station]

Figure 18:
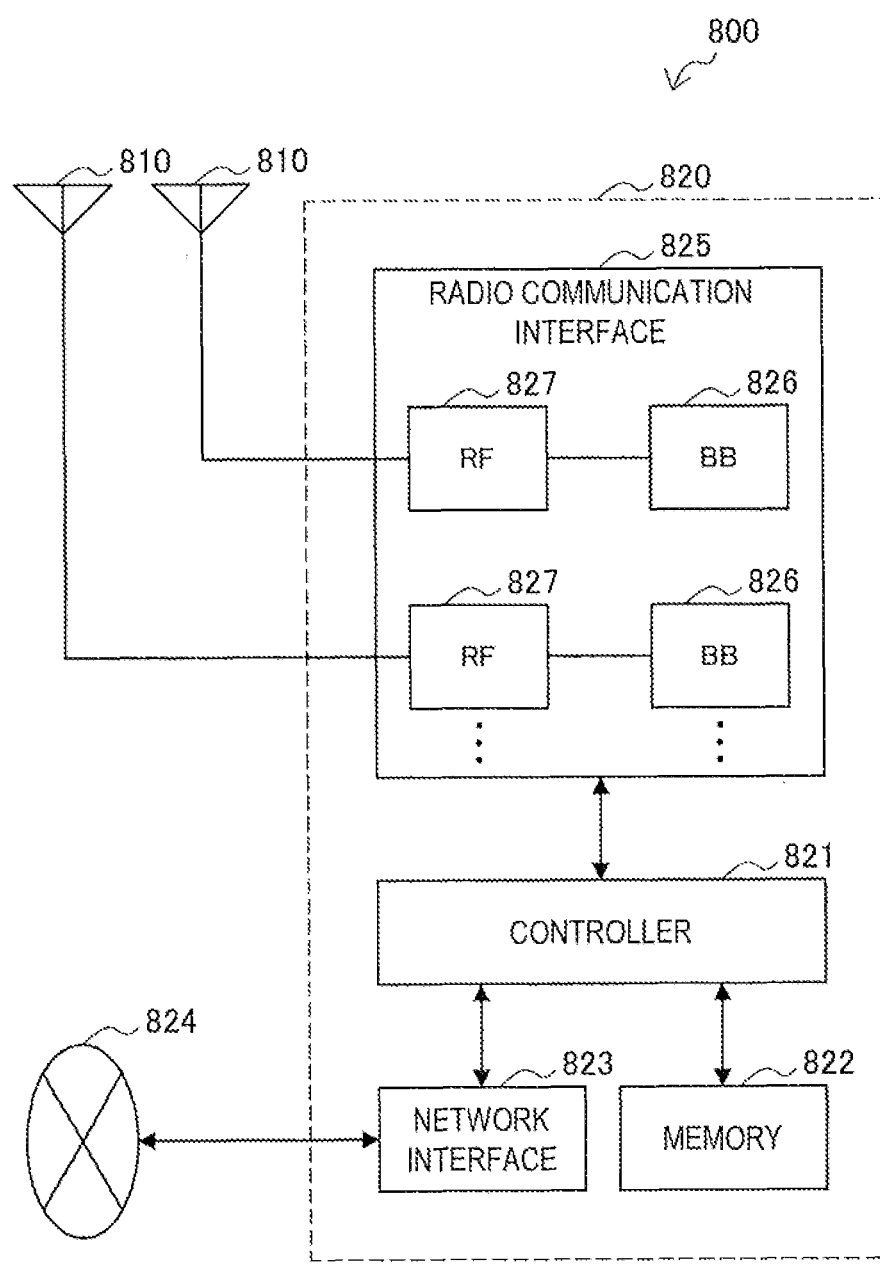
FIG. 18 is a block diagram illustrating an example of a schematic configuration of an eNB.

FIG. 18 is a block diagram illustrating an example of the schematic configuration of an eNB to which the technology of the present disclosure may be applied. An eNB 800 includes one or more antennas 810 and a base station apparatus 820. Each antenna 810 and the base station apparatus 820 may be connected to each other via an RE cable.

Each of the antennas 810 includes a single or multiple antenna elements (such as multiple antenna elements included in an MIMO antenna), and is used for the base station apparatus 820 to transmit and receive radio signals. The eNB 800 may include the multiple antennas 810, as illustrated in FIG. 18. For example, the multiple antennas 810 may be compatible with multiple frequency bands used by the eNB 800, respectively. Note that FIG. 18 illustrates the example in which the eNB 800 includes the multiple antennas 810, but the eNB 800 may also include a single antenna 810.

The base station apparatus 820 includes a controller 821, a memory 822, a network interface 823, and a radio communication interface 825.

The controller 821 may be, for example, a CPU or a DSP, and operates various functions of a higher layer of the base station apparatus 820. For example, the controller 821 generates a data packet from data in signals processed by the radio communication interface 825, and transfers the generated packet via the network interface 823. The controller 821 may bundle data from multiple base band processors to generate the bundled packet and transfer the generated bundled packet. The controller 821 may have logical functions of performing control such as radio resource control, radio bearer control, mobility management, admission control, and scheduling. The control may be performed in corporation with an eNB or a core network node in the vicinity. The memory 822 includes a RAM and a ROM, and stores a program that is executed by the controller 821, and various types of control data (such as a terminal list, transmission power data, and scheduling data).

The network interface 823 is a communication interface for connecting the base station apparatus 820 to a core network 824. The controller 821 may communicate with a core network node or another eNB via the network interface 823. In that case, the eNB 800, and the core network node or the other eNB may be connected to each other through a logical interface (such as an S1 interface and an X2 interface). The network interface 823 may also be a wired communication interface or a radio communication interface for radio backhaul. If the network interface 823 is a radio communication interface, the network interface 823 may use a higher frequency band for radio communication than a frequency band used by the radio communication interface 825.

The radio communication interface 825 supports any cellular communication scheme such as long term evolution (LTE) and LTE-Advanced, and provides radio connection to a terminal positioned in a cell of the eNB 800 via the antenna 810. The radio communication interface 825 may typically include, for example, a baseband (BB) processor 826 and an RF circuit 827. The BB processor 826 may perform, for example, encoding/decoding, modulating/demodulating, and multiplexing/demultiplexing, and performs various types of signal processing of layers (such as L1, medium access control (MAC), radio link control (RLC), and a packet data convergence protocol (PDCP)). The BB processor 826 may have a part or all of the above-described logical functions instead of the controller 821. The BB processor 826 may be a memory that stores a communication control program, or a module that includes a processor and a related circuit configured to execute the program. Updating the program may allow the functions of the BB processor 826 to be changed. The module may be a card or a blade that is inserted into a slot of the base station apparatus 820. Alternatively, the module may also be a chip that is mounted on the card or the blade. Meanwhile, the RF circuit 827 may include, for example, a mixer, a filter, and an amplifier, and transmits and receives radio signals via the antenna 810.

The radio communication interface 825 may include the multiple BB processors 826, as illustrated in FIG. 18. For example, the multiple BB processors 826 may be compatible with multiple frequency bands used by the eNB 800. The radio communication interface 825 may include the multiple RF circuits 827, as illustrated in FIG. 18. For example, the multiple RF circuits 827 may be compatible with multiple antenna elements, respectively. Note that FIG. 18 illustrates the example in which the radio communication interface 825 includes the multiple BB processors 826 and the multiple RF circuits 827, but the radio communication interface 825 may also include a single BB processor 826 or a single RF circuit 827.

In the eNB 800 of FIG. 18, the small cell control unit 132, the protection target cell selection unit 134 and the area determination unit 136 described using FIG. 5 may be mounted on the controller 821. For example, the eNB 800 can determine the arrangement of the small cells so as to protect the protection target cell from the harmful interference to enhance the communication efficiency as the whole network.

[5-3. Application Examples Related to Terminal Apparatus]

First Application Example

Figure 19:
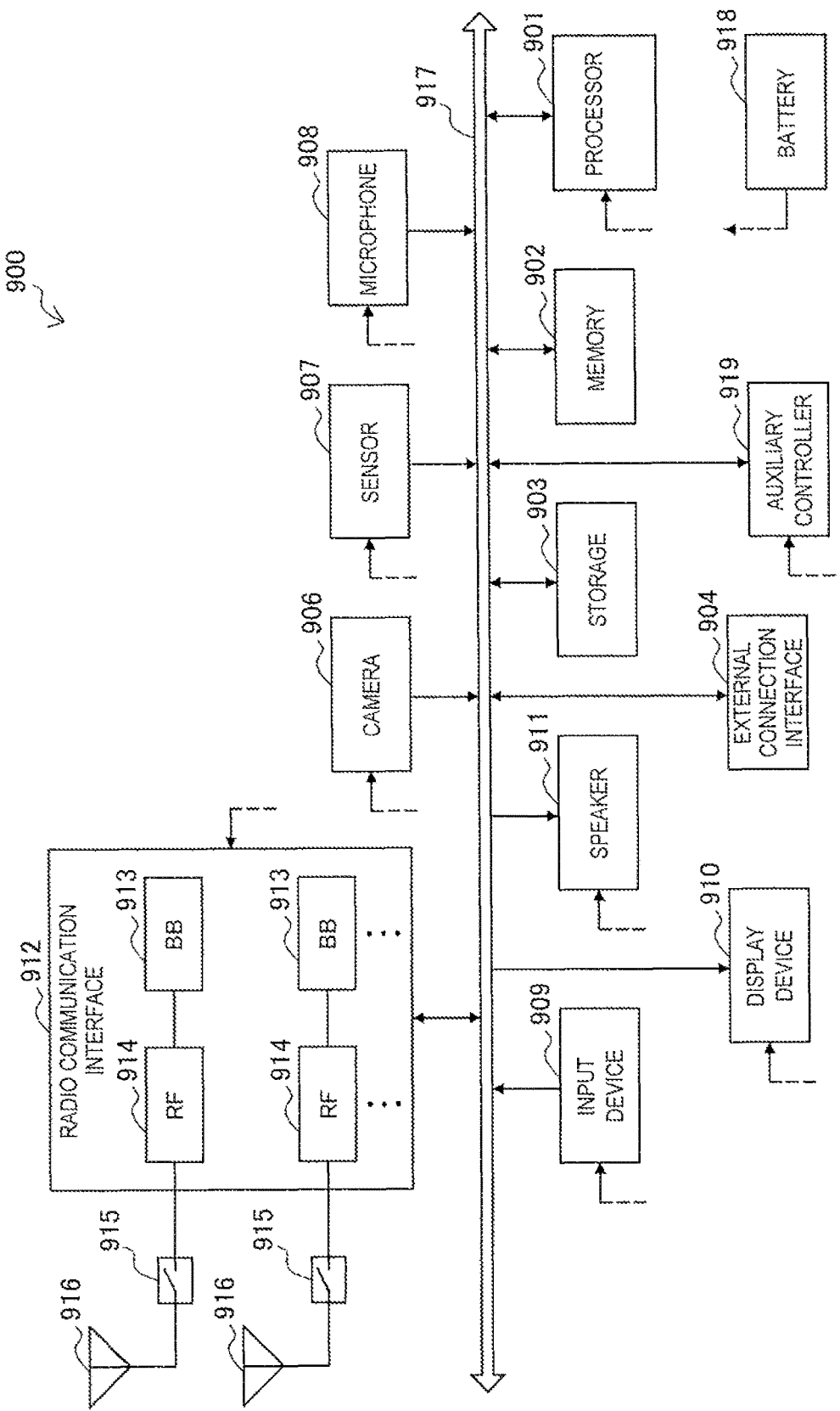
FIG. 19 is a block diagram illustrating au example of a schematic configuration of a smartphone.

FIG. 19 is a block diagram illustrating an example of the schematic configuration of a smartphone 900 to which the technology of the present disclosure may be applied. The smartphone 900 includes a processor 901, a memory 902, a storage 903, an external connection interface 904, a camera 906, a sensor 907, a microphone 908, an input device 909, a display device 910, a speaker 911, a radio communication interface 912, one or more antenna switches 915, one or more antennas 916, a bus 917, a battery 918, and an auxiliary controller 919.

The processor 901 may be, for example, a CPU or a system on chip (SoC), and controls functions of an application layer and another layer of the smartphone 900. The memory 902 includes a RAM and a ROM, and stores a program that is executed by the processor 901, and data. The storage 903 may include a storage medium such as a semiconductor memory and a hard disk. The external connection interface 904 is an interface for connecting an external device such as a memory card and a universal serial bus (USB) device to the smartphone 900.

The camera 906 includes an image sensor such as a charge coupled device (CCD) and a complementary metal oxide semiconductor (CMOS), and generates a captured image. The sensor 907 may include a group of sensors such as a measurement sensor, a gyro sensor, a geomagnetic sensor, and an acceleration sensor. The microphone 908 converts sounds that are input to the smartphone 900 to audio signals. The input device 909 includes, for example, a touch sensor configured to detect touch onto a screen of the display device 910, a keypad, a keyboard, a button, or a switch, and receives an operation or an information input from a user. The display device 910 includes a screen such as a liquid crystal display (LCD) and an organic light-emitting diode (OLED) display, and displays an output image of the smartphone 900. The speaker 911 converts audio signals that are output from the smartphone 900 to sounds.

The radio communication interface 912 supports any cellular communication scheme such as LTE and LTE-Advanced, and performs radio communication. The radio communication interface 912 may typically include, for example, a BB processor 913 and an RF circuit 914. The BB processor 913 may perform, for example, encoding/decoding, modulating/demodulating, and multiplexing/demultiplexing, and performs various types of signal processing for radio communication. Meanwhile, the RF circuit 914 may include, for example, a mixer, a filter, and an amplifier, and transmits and receives radio signals via the antenna 916. The radio communication interface 912 may also be a one chip module that has the BB processor 913 and the RF circuit 914 integrated thereon. The radio communication interface 912 may include the multiple BB processors 913 and the multiple RF circuits 914, as illustrated in FIG. 19. Note that FIG. 19 illustrates the example in which the radio communication interface 912 includes the multiple BB processors 913 and the multiple RE circuits 914, but the radio communication interface 912 may also include a single BB processor 913 or a single RF circuit 914.

Furthermore, in addition to a cellular communication scheme, the radio communication interface 912 may support another type of radio communication scheme such as a short-distance wireless communication scheme, a near field communication scheme, and a radio local area network (LAN) scheme. In that case, the radio communication interface 912 may include the BB processor 913 and the RF circuit 914 for each radio communication scheme.

Each of the antenna switches 915 switches connection destinations of the antennas 916 among multiple circuits (such as circuits for different radio communication schemes) included in the radio communication interface 912.

Each of the antennas 916 includes a single or multiple antenna elements (such as multiple antenna elements included in an MIMO antenna), and is used for the radio communication interface 912 to transmit and receive radio signals. The smartphone 900 may include the multiple antennas 916, as illustrated in FIG. 19. Note that FIG. 19 illustrates the example in which the smartphone 900 includes the multiple antennas 916, but the smartphone 900 may also include a single antenna 916.

Furthermore, the smartphone 900 may include the antenna 916 for each radio communication scheme. In that case, the antenna switches 915 may be omitted from the configuration of the smartphone 900.

The bus 917 connects the processor 901, the memory 902, the storage 903, the external connection interface 904, the camera 906, the sensor 907, the microphone 908, the input device 909, the display device 910, the speaker 911, the radio communication interface 912, and the auxiliary controller 919 to each other. The battery 918 supplies power to blocks of the smartphone 900 illustrated in FIG. 19 via feeder lines, which are partially shown as dashed lines in the figure. The auxiliary controller 919 operates a minimum necessary function of the smartphone 900, for example, in a sleep mode.

In the smartphone 900 of FIG. 19, the communication control unit 254 described using FIG. 15 may be mounted on the radio communication interface 912. Further, at least a part of the function may be mounted on the processor 901 or the auxiliary controller 919. For example, the smartphone 900 can start operating, the new small cell according to the instruction from the above-described networking control node to enhance the communication efficiency as the whole network.

Second Application Example

Figure 20:
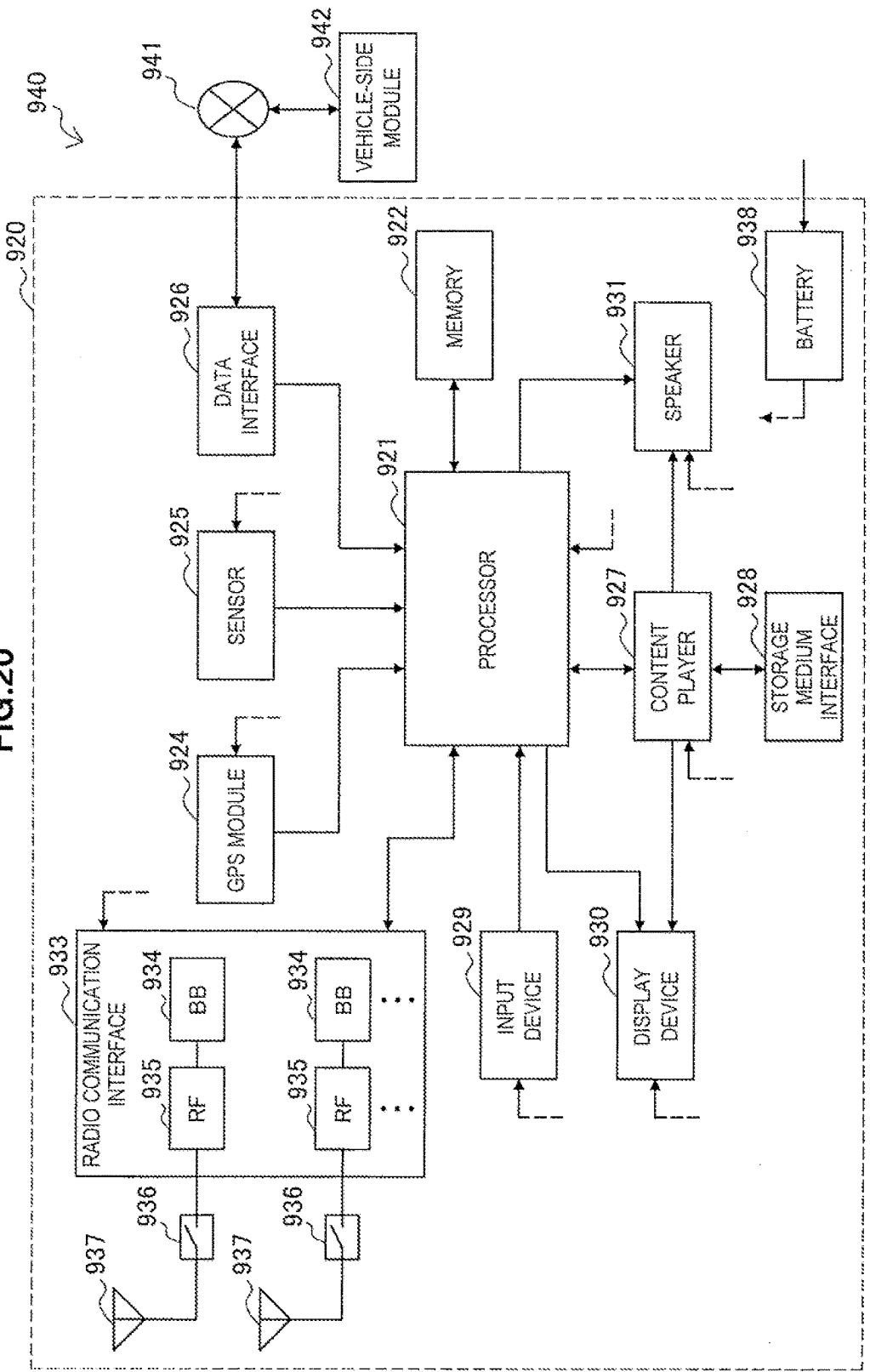
FIG. 20 is a block diagram illustrating an example of a schematic configuration of a car navigation apparatus.

FIG. 20 is a block diagram illustrating an example of the schematic configuration of a car navigation apparatus 920 to which the technology of the present disclosure may be applied. The car navigation apparatus 920 includes a processor 921, a memory 922, a global positioning system (GPS) module 924, a sensor 925, a data interface 926, a content player 927, a storage medium interface 928, an input device 929, a display device 930, a speaker 931, a radio communication interface 933, one or more antenna switches 936, one or more antennas 937, and a battery 938.

The processor 921 may be, for example, a CPU or a SoC, and controls a navigation function and another function of the car navigation apparatus 920. The memory 922 includes a RAM and a ROM, and stores a program that is executed by the processor 921, and data.

The GPS module 924 uses GPS signals received from a GPS satellite to measure a position (such as latitude, longitude, and altitude) of the car navigation apparatus 920. The sensor 925 may include a group of sensors such as a gyro sensor, a geomagnetic sensor, and an air pressure sensor. The data interface 926 is connected to, for example, an in-vehicle network 941 via a terminal that is not shown, and acquires data generated by the vehicle, such as vehicle speed data.

The content player 927 reproduces content stored in a storage medium (such as a CD and a DVD) that is inserted into the storage medium interface 928. The input device 929 includes, for example, a touch sensor configured to detect touch onto a screen of the display device 930, a button, or a switch, and receives an operation or an information input from a user. The display device 930 includes a screen such as a LCD or an OLED display, and displays an image of the navigation function or content that is reproduced. The speaker 931 outputs sound of the navigation function or the content that is reproduced.

The radio communication interface 933 supports any cellular communication scheme such as LET and LTE-Advanced, and performs radio communication. The radio communication interface 933 may typically include, for example, a BB processor 934 and an RF circuit 935. The BB processor 934 may perform, for example, encoding decoding, modulating/demodulating, and multiplexing/demultiplexing, and performs various types of signal processing for radio communication. Meanwhile, the RF circuit 935 may include, for example, a mixer, a filter, and an amplifier, and transmits and receives radio signals via the antenna 937. The radio communication interface 933 may be a one chip module having the BB processor 934 and the RF circuit 935 integrated thereon. The radio communication interface 933 may include the multiple BB processors 934 and the multiple RF circuits 935, as illustrated in FIG. 20. Note that FIG. 20 illustrates the example in which the radio communication interface 933 includes the multiple BB processors 934 and the multiple RF circuits 935, but the radio communication interface 933 may also include a single BB processor 934 or a single RF circuit 935.

Furthermore, in addition to a cellular communication scheme, the radio communication interface 933 may support another type of radio communication. Schemer such as a short-distance wireless communication scheme, a near field communication scheme, and a radio LAN scheme. In that case, the radio communication interface 933 may include the BB processor 934 and the RF circuit 935 for each radio communication scheme.

Each of the antenna switches 936 switches connection destinations of the antennas 937 among multiple circuits (such as circuits for different radio communication schemes) included in the radio communication interface 933.

Each of the antennas 937 includes a single or multiple antenna elements (such as multiple antenna elements included in an MIMO antenna), and is used for the radio communication interface 933 to transmit and receive radio signals. The car navigation apparatus 920 may include the multiple antennas 937, as illustrated in FIG. 20. Note that FIG. 20 illustrates the example in which the car navigation apparatus 920 includes the multiple antennas 937, but the car navigation apparatus 920 may also include a single antenna 937.

Furthermore, the car navigation apparatus 920 may include the antenna 937 for each radio communication scheme. In that case, the antenna switches 936 may be omitted from the configuration of the ear navigation apparatus 920.

The battery 938 supplies power to blocks of the car navigation apparatus 920 illustrated in FIG. 20 via feeder lines that are partially shown as dashed lines in the figure. The battery 938 accumulates power supplied form the vehicle.

In the car navigation apparatus 920 of FIG. 20, the communication control unit 254 described using FIG. 15 may be mounted on the radio communication interface 933. Further, at least a part of the function may be mounted on the processor 921. For example, the car navigation apparatus 920 can start operating the new small cell according to the instruction from the above-described networking control node to enhance the communication efficiency as the whole network.

The technology of the present disclosure may also be realized as an in-vehicle system (or a vehicle) 940 including one or more blocks of the car navigation apparatus 920, the in-vehicle network 941, and a vehicle-side module 942. The vehicle-side module 942 generates vehicle data such as vehicle speed, engine speed, and trouble information, and outputs the generated data to the in-vehicle network 941.

<6. Summary>

Up to here, the embodiments of the technology according to the present disclosure hare been described in detail using FIG. 1 to FIG. 20. According to the embodiments described above, the protection target cell to be protected from the interference caused by the new small cell newly configured using the dynamic AP is dynamically selected among the one or more existing cells, and the operation of the new small cell is started so that only the selected protection target cell is protected from the harmful interference. Therefore, under the heterogeneous network environment, it is possible to achieve the appropriate protection of the protection target cell contributing to the efficient formation of the radio network, and the effective arrangement of the new small cell in place of the existing cell contributing less to the communication efficiency. Accordingly, the arrangement of the small cell is optimized to improve the communication efficiency as the whole network.

Moreover, according to the embodiments described above, the protection target cell is selected on the basis of the comparison of the communication efficiency between the assumed cell assumed to be operated by the dynamic AP and the existing cell, having the coverages overlapped with each other. Therefore, the coverage that should have excessively been limited in such a method as to uniformly avoid the interference to the existing cell, can be extended so as to take in the coverage of the existing cell otherwise. When the coverage of the assumed cell is simply determined from the maximum transmission power of the terminal apparatus operating the assumed cell, a complicated algorithm having a high calculation cost is not required for selecting the protection target cell.

Moreover, according to the embodiments described above, the small cell installation area is determined so that the interference to each of the protection target cells does not exceed the allowable level, and the master terminal that should operate the new small cell is selected from the dynamic APs existing within the determined small cell installation area. Therefore, it is possible to flexibly operate the network such as switching the master terminal to another dynamic AP if necessary, or changing the number of the master terminals, within the small cell installation area.

Moreover, according to the embodiments described above, the scoring of the communication efficiency for each of the plurality of candidate points is performed and the small cell installation area is determined on the basis of the scoring result. The candidate point is not always a point where the dynamic AP exists at that moment. Therefore, it is possible to arrange the small cell installation area at a place where effectiveness is maintained for a certain amount of time without fully depending on the location of the dynamic AP that can vary with time.

Note that the series of control processing by the respective apparatuses described herein may be implemented by using any of software, hardware, and a combination of software and hardware. Programs constituting the software are previously stored in, for example, a recording medium (or a non-transitory recording medium) provided in the inside or the outside of the respective apparatuses. And the respective programs are, for example, read into a random access memory (RAM) during execution and executed by the processor such as the CPU.

The preferred embodiments of the present disclosure have been described above with reference to the accompanying drawings, whilst the present invention is not limited to the above examples, of course. A person skilled in the art may find various alterations and modifications within the scope of the appended claims, and it should be understood that they will naturally come under the technical scope of the present invention.

Additionally, the technology according to the present disclosure may also be configured as below.

(1)

A communication control apparatus including:

a selection unit that uses information related to one or more terminal apparatuses operable as an access point for a small cell to select a protection target cell to be protected from interference caused by a new small cell newly configured, among one or more existing cells; and a control unit that gives an instruction of an operation of the new small cell to the at least one terminal apparatus existing at a position determined in a manner that interference to each of the protection target cells selected by the selection unit does not exceed an allowable level.

(2)

The communication control apparatus according to (1), wherein the selection unit selects the protection target cell on the basis of evaluation of communication efficiency for an assumed cell assumed to be operated by each of the one or more terminal apparatuses, and the existing cell having coverage overlapped with coverage of the assumed cell.

(3)

The communication control apparatus according to (2), wherein the selection unit excludes, from the protection target cell, the existing cell having the poorer communication efficiency than the communication efficiency of the corresponding assumed cell.

(4)

The communication control apparatus according to (3), wherein the selection unit, when overlapping of the coverage of the existing cell having the poorer communication efficiency than the communication efficiency of the corresponding assumed cell is resolved by reduction in transmission power of the existing cell, includes the existing cell into the protection target cell on the condition of the reduction in transmission power.

(5)

The communication control apparatus according to any one of (2) to (4), wherein the selection unit determines coverage of each assumed cell from maximum transmission power of the terminal apparatus operating the assumed cell.

(6)

The communication control apparatus according to any one of (2) to (5), wherein the selection unit evaluates at least one of an accommodated terminal count, an accommodated terminal communication amount and communication quality of each cell, as the communication efficiency.

The communication control apparatus according to any one of (1) to (6), further including:

an area determination unit that determines an installation area where the new small cell can be installed in a manner that the interference to each of the protection target cells selected by the selection unit does not exceed the allowable level, wherein the control unit gives an instruction of the operation of the new small cell to the at least one terminal apparatus existing within the installation area determined by the area determination unit.

(8)

The communication control apparatus according to (7), wherein the area determination unit performs scoring of improvement in communication efficiency when the new small cell is installed at each point of a plurality of points to be scanned within a scanning area, for each point, to determine the installation area in a manner that the installation area includes a point indicating a relatively good score.

(9)

The communication control apparatus according to (8), wherein the area determination unit determines the score of each of the plurality of points on the basis of at least one of an accommodated terminal count, an accommodated terminal communication amount, an access point candidate count and a size of coverage.

(10)

The communication control apparatus according to (8) or (9), wherein the area determination unit determines the score of each of the plurality of points on the basis of communication quality for each accommodated terminal.

(11)

The communication control apparatus according to any one of (7) to (10), wherein the area determination unit, when improvement in communication quality for a specific terminal is requested, determines the installation area in a manner that a current position of the specific terminal is included in coverage of the new small cell.

(12)

The communication control apparatus according to any one of (7) to (11), wherein the area determination unit determines the installation area in a manner that a predetermined number of the terminal apparatuses having capability operable as the access point are included in the installation area.

(13)

The communication control apparatus according to any one of (1) to (12), wherein the one or more terminal apparatuses are identified on the basis of capability data acquired for each terminal apparatus.

(14)

The communication control apparatus according to (1), wherein the one or more terminal apparatuses are an apparatus that has capability operable as the access point, and has communication quality between the apparatus and a macro cell, a remaining battery level, or mobility satisfying a predetermined reference.

(15)

The communication control apparatus according to any one of (1) to (14), wherein the communication control apparatus is a base station that operates a macro cell, and wherein the one or more terminal apparatuses are positioned within the macro cell.

(16)

A communication control method including:

using information related to one or more terminal apparatuses operable as an access point for a small cell to select a protection target cell to be protected from interference caused by a new small cell newly configured, among one or more existing cells; and giving an instruction of an operation of the new small cell to the at least one terminal apparatus existing at a position determined in a manner that interference to each of the protection target cells selected does not exceed an allowable level.

(17)

A program that allows a computer that controls a communication control apparatus to function as:

a selection unit that uses information related to one or more terminal apparatuses operable as an access point for a small cell to select a protection target cell to be protected from interference caused by a new small cell newly configured, among, one or more existing cells; and a control unit that gives an instruction of an operation of the new small cell to the at least one terminal apparatus existing at a position determined in a manner that interference to each of the protection target cells selected by the selection unit does not exceed an allowable level.

(18)

A terminal apparatus operable as an access point for a small cell, the terminal apparatus including:

a communication unit that communicates with a communication control apparatus that selects a protection target cell to be protected from interference caused by a new small cell newly configured, among one or more existing cells; and a control unit that, when it is determined by the communication control apparatus that the terminal apparatus exists at a position determined in a manner that interference to each of the protection target cells selected by the communication control apparatus does not exceed an allowable level, starts operating the new small cell according to an instruction from the communication control apparatus.

REFERENCE SIGNS LIST 100 communication control apparatus
132 small cell control unit
134 protection target cell selection unit
136 area determination unit
200 terminal apparatus (dynamic access point)
210 communication unit
254 communication control unit

The invention claimed is:

1. A communication control apparatus comprising:
circuitry configured to
select, using information related to one or more terminal apparatuses operable as an access point, a target protection area to be protected from interference caused by a new access point, among one or more existing areas, and
give an instruction of an operation of the new access point to the at least one terminal apparatus existing at a position determined in a manner that interference to the selected target protection area does not exceed an allowable level,
wherein the circuitry is further configured to select the target protection area based on a required communication quality for an area which is assumed to be operated by one of the one or more terminal apparatuses.

2. The communication control apparatus according to claim 1,
wherein the circuitry is further configured to select the target protection area on the basis of evaluation of the required communication quality for the assumed area that is assumed to be operated by each of the one or more terminal apparatuses, and an existing area having coverage overlapped with coverage of the assumed area.

3. The communication control apparatus according to claim 2,
wherein the circuitry is further configured to exclude, from the target protection area, the existing area having the poorer communication quality than the communication quality of the corresponding assumed area.

4. The communication control apparatus according to claim 3,
wherein the circuitry is further configured to, when overlapping of the coverage of the existing area having the poorer communication quality than the communication quality of the corresponding assumed area is resolved by reduction in transmission power of the existing area, include the existing area into the target protection area on a condition of a reduction in transmission power.

5. The communication control apparatus according to claim 2,
wherein the circuitry is further configured to determine coverage of each assumed area from maximum transmission power of the terminal apparatus operating the assumed area.

6. The communication control apparatus according to claim 2,
wherein the circuitry is further configured to evaluate at least one of an accommodated terminal count, an accommodated terminal communication amount, and communication quality of each area, as the required communication quality.

7. The communication control apparatus according, to claim 1, wherein the circuitry is further configured to
determine an installation area where the new access point is installable in a manner that the interference to the selected target protection area s does not exceed an allowable level, and
give an instruction of the operation of the new access point to the at least one terminal apparatus existing within the installation area determined.

8. The communication control apparatus according to claim 7,
wherein the circuitry is further configured to perform scoring of improvement in a communication quality when the new access point is installed at each point of a plurality of points to be scanned within a scanning area, for each point, to determine the installation area in a manner that the installation area includes a point indicating a relatively good score.

9. The communication control apparatus according to claim 8,
wherein the circuitry is further configured to determine the score of each of the plurality of points on a basis of at least one of an accommodated terminal count, an accommodated terminal communication amount, an access point candidate count, and a size of coverage.

10. The communication control apparatus according to claim 8,
wherein the circuitry is further configured to determine the score of each of the plurality of points on a basis of communication quality for each accommodated terminal.

11. The communication control apparatus according to claim 7,
wherein the circuitry is further configured to determine, when improvement in communication quality for a specific terminal is requested, the installation area in a manner that a current position of the specific terminal is included in coverage of the new access point.

12. The communication control apparatus according to claim 7,
wherein the circuitry is further configured to determine the installation area in a manner that a predetermined number of the terminal apparatuses having a capability of operating as the access point are included in the installation area.

13. The communication control apparatus according to claim 1,
wherein the one or more terminal apparatuses are identified on a basis of capability data acquired for each terminal apparatus.

14. The communication control apparatus according to claim 13,
wherein the one or more terminal apparatuses are an apparatus that has a capability of operating as the access point, has a sufficient communication quality between the apparatus and the communication control apparatus, a remaining battery level, or mobility satisfying a predetermined reference.

15. The communication control apparatus according to claim 1,
wherein the communication control apparatus is a base station that operates an area, and
wherein the one or more terminal apparatuses are positioned within the area.

16. A communication control method comprising:
using information related to one or more terminal apparatuses operable as an access point to select a target protection area to be protected from interference caused by a new access point, among one or more existing areas; and giving an instruction of an operation of the new access point to the at least one terminal apparatus existing at a position determined in a manner that interference to the selected target protection area does not exceed an allowable level, wherein the selection of the target protection area is based on a required communication quality for an area which is assumed to be operated by one of the one or more terminal apparatuses.

17. A terminal apparatus operable as an access point, the terminal apparatus comprising:

circuitry configured to communicate with a communication control apparatus that selects a target protection area to be protected from interference caused by a new access point newly configured among one or more existing areas, wherein selection of the target protection area is based on relative required communication quality for an area which is assumed to be operated by one of the one or more terminal apparatuses; and start, when it is determined by the communication control apparatus that the terminal apparatus exists at a position determined in a manner that interference to the target protection area selected by the communication control apparatus does not exceed an allowable level, operating the new access point according to an instruction from the communication control apparatus.

18. A non-transitory computer readable medium having stored thereon a program that when executed by a computer causes the computer to execute a communication control method comprising:

using information related to one or more terminal apparatuses operable as an access point to select a target protection area to be protected from interference caused by a new access point, among one or more existing areas; and giving an instruction of an operation of the new access point to the at least one terminal apparatus existing at a position determined in a manner that interference to the selected target protection area does not exceed an allowable level, wherein the selection of the target protection area is based on a required communication quality for an area which is assumed to be operated by one of the one or more terminal apparatuses.

* * * * *